(12) United States Patent
Ohno et al.

(10) Patent No.: US 11,117,051 B2
(45) Date of Patent: Sep. 14, 2021

(54) VIDEO GAME PROGRAM AND GAME SYSTEM

(71) Applicant: SQUARE ENIX CO., LTD., Tokyo (JP)

(72) Inventors: Hiroaki Ohno, Tokyo (JP); Kei Odagiri, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/915,077

(22) Filed: Jun. 29, 2020

(65) Prior Publication Data

US 2020/0324202 A1     Oct. 15, 2020

Related U.S. Application Data

(63) Continuation of application No. 16/177,916, filed on Nov. 1, 2018, now Pat. No. 10,737,176.

(30) Foreign Application Priority Data

Jan. 19, 2018     (JP) .............................. JP2018-007731

(51) Int. Cl.
    *A63F 13/497*     (2014.01)
(52) U.S. Cl.
    CPC ...... *A63F 13/497* (2014.09); *A63F 2300/634* (2013.01)
(58) Field of Classification Search
    None
    See application file for complete search history.

(56) References Cited

U.S. PATENT DOCUMENTS

| 8,287,378 B2 | 10/2012 | Ogawa |
| 9,079,106 B2 * | 7/2015 | Oku ........................ A63F 13/10 |
| 9,219,835 B2 | 12/2015 | Numata |

(Continued)

FOREIGN PATENT DOCUMENTS

| JP | 2003-236234 | 8/2003 |
| JP | 2005-224281 | 8/2005 |

(Continued)

OTHER PUBLICATIONS

Office Action from Japan Patent Office (JPO) in Japanese Patent Appl. No. 2018-007731, dated Dec. 25, 2018, together with an English language translation.

(Continued)

*Primary Examiner* — Ronald Laneau
(74) *Attorney, Agent, or Firm* — Greenblum & Bernstein, P.L.C.

(57) ABSTRACT

Disclosed is a video game program for causing a computer to realize an acquisition function of acquiring replay data for reproducing play contents already ended of a user in a game space in which a plurality of characters including a player character of the user appear, an image generation function of generating a replay image to be displayed on a display based on the acquired replay data, and a selection function of selecting one or more characters from among the plurality of characters as a focus character based on a selection operation on an operator by the user. In the image generation function, the replay image is generated in a display format for the focus character.

13 Claims, 22 Drawing Sheets

(56) References Cited

U.S. PATENT DOCUMENTS

| | | | |
|---|---|---|---|
| 9,233,302 B2 | 1/2016 | Nanba et al. | |
| 9,403,088 B2 | 8/2016 | Nakashima | |
| 10,398,975 B2 | 9/2019 | Hayashida | |
| 10,924,448 B2 * | 2/2021 | Ward | H04L 61/103 |
| 2012/0202593 A1 | 8/2012 | Ito et al. | |
| 2014/0342798 A1 * | 11/2014 | Fujisawa | G07F 17/3267 463/20 |
| 2014/0364206 A1 | 12/2014 | Shiraiwa et al. | |
| 2016/0287987 A1 * | 10/2016 | Onda | A63F 13/86 |

FOREIGN PATENT DOCUMENTS

| | | |
|---|---|---|
| JP | 2008-188051 | 8/2008 |
| JP | 2015-013103 | 1/2015 |

OTHER PUBLICATIONS

PUBG 1.0, The new function "Replay" is amazing, EAA, YouTube [online] [video], Dec. 21, 2017, URL: https://www.youtube.com/watch?V=_CjMBF9OLV8.

Office Action from Japan Patent Office (JPO) in Japanese Patent Appl. No. 2018-007731, dated Jul. 2, 2019, together with an English language translation.

* cited by examiner

FIG.20A

| CODE ID | RECORDING DATE AND TIME | CONTENT ID | PLAYER CHARACTER | | ... |
|---|---|---|---|---|---|
| | | | 1 | 2 | ... |
| H001 | Aug,17,2017 | *** | USER ID, NAME, OCCUPATION, SEX, VITAL POWER, ... | USER ID, NAME, OCCUPATION, SEX, VITAL POWER, ... | ... |

FIG.20B

| CODE ID | PLAYER CHARACTER | | ... | NON PLAYER CHARACTER | | ... |
|---|---|---|---|---|---|---|
| | 1 | 2 | ... | 1 | 2 | ... |
| R001 | USER ID, MOVEMENT, EXECUTION ACTION, TARGET SELECTION, VITAL POWER ... | USER ID, MOVEMENT, EXECUTION ACTION, TARGET SELECTION, VITAL POWER ... | ... | USER ID, MOVEMENT, EXECUTION ACTION, TARGET SELECTION, VITAL POWER ... | USER ID, MOVEMENT, EXECUTION ACTION, TARGET SELECTION, VITAL POWER ... | ... |

FIG.20C

| CODE ID |
|---|
| E001 |

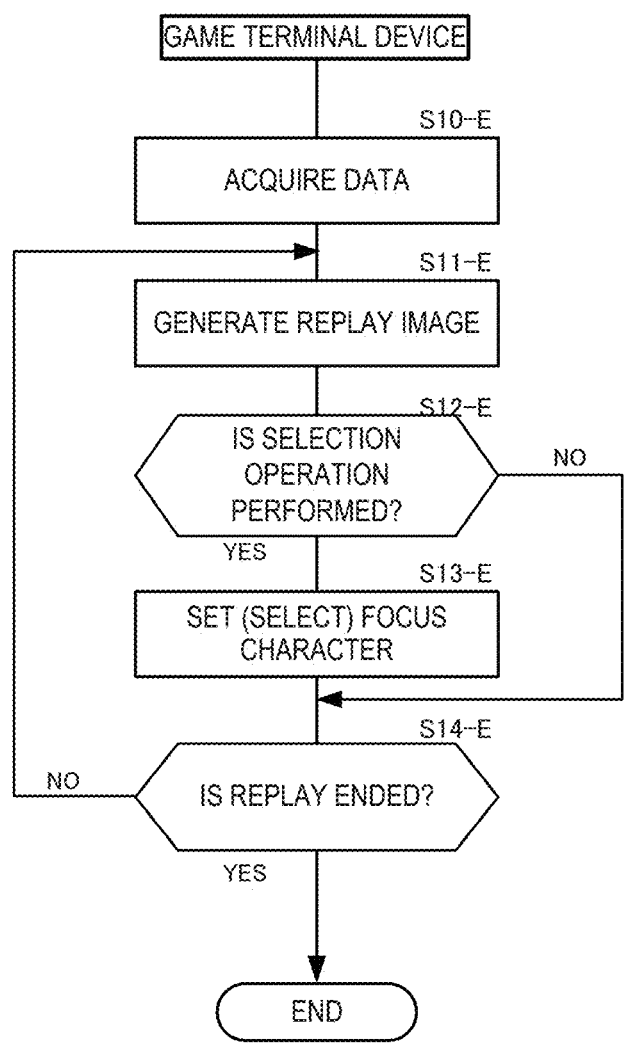

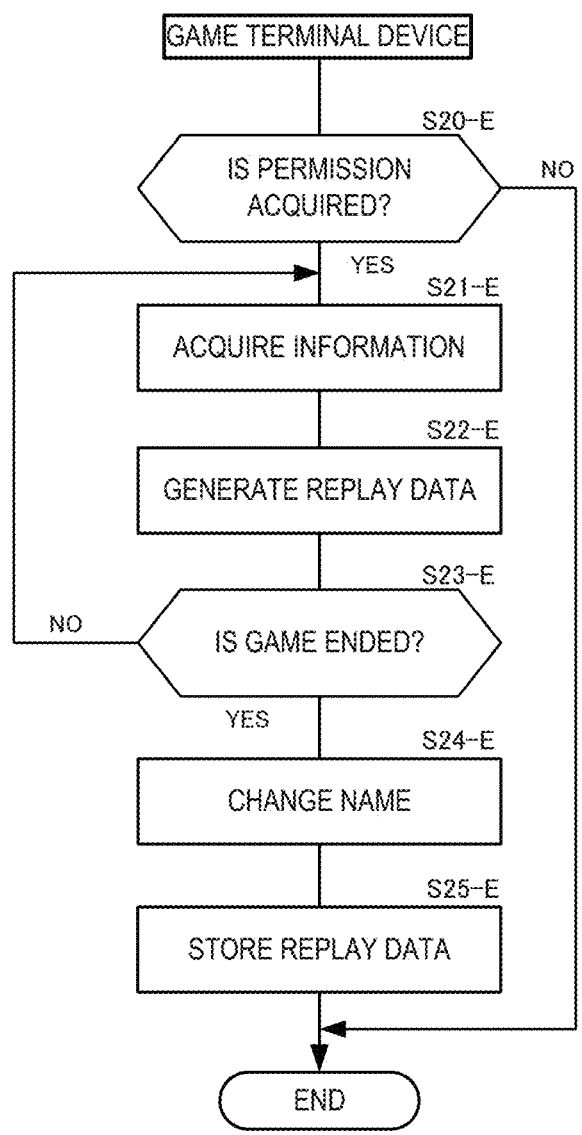

VIDEO GAME PROGRAM AND GAME SYSTEM

CROSS REFERENCE TO RELATED APPLICATIONS

This is a continuation of U.S. patent application Ser. No. 16/177,916, filed Nov. 1, 2018, which claims the benefit of Japanese Pat. Appl. No. 2018-007731, filed Jan. 19, 2018. The entire disclosure of each of the above-identified documents, including the specification, drawings, and claims, is incorporated herein by reference in its entirety.

BACKGROUND OF THE INVENTION

1. Field of the Invention

At least one of embodiments of the present invention relates to a video game program and the like for controlling reproduction of replay data of a video game.

2. Description of Related Art

In many video games (games), a replay function is provided (see, for example, JP-A-2003-236234). The replay function is a function of reproducing game contents already played by a user with video (replay image), voice, and the like. For example, during play of the game, when the user performs a start operation, storing of the replay data for generating a replay image is started. By watching the replay image of the user, for example, the user can examine an improvement point of user's own play. Also, by watching the replay image of another user, for example, the user can utilize the replay image of another user as a model for better playing.

In recent years, a game such as an online game that clears a common problem with a party constituted with player characters of each of a plurality of users is also provided.

Basically, the replay image as described above becomes an image based on a player character and the like of the user who is playing. For that reason, in the user's own replay image.
it is difficult to ascertain more detailed information on other characters such as player characters of other users and enemy characters existing in the game space.

An object of at least one of the embodiments of the invention is to solve a lack of relevant technology in the related art.

SUMMARY OF THE INVENTION

From a non-limiting point of view, according to an embodiment of the invention, there is provided a game program for causing a computer to realize an acquisition function of acquiring replay data for reproducing play contents already ended of a user in a game space in which a plurality of characters including a user's player character appear, an image generation function of generating a replay image to be displayed on a display based on the acquired replay data, and a selection function of selecting one or more characters from among the plurality of characters as a focus character based on a selection operation on an operator by the user, and in which, in the image generation function, a function of generating the replay image in a display format for the focus character is realized.

From a non-limiting point of view, according to an embodiment of the invention, there is provided a game program for causing a server device connected to a plurality of game terminal devices that execute a game in which a plurality of characters including a player character of a user appear in a game space via a communication network to realize an acquisition function of acquiring replay data for reproducing play contents already ended of a user in the game space in which the plurality of characters appear, an image generation function of generating a replay image to be displayed on a display based on the acquired replay data, and a selection function of selecting one or more characters from among the plurality of characters as a focus character based on a selection operation on an operator by the user, and in which, in the image generation function, a function of generating the replay image in a display format for the focus character is realized.

From a non-limiting point of view, according to an embodiment of the invention, there is provided a game system that includes a plurality of game terminal devices that execute a game in which a plurality of characters including a player character of a user appears in a game space and a server device connected to the plurality of game terminal devices via a communication network, the game system includes an acquirer that acquires replay data for reproducing play contents already ended of a user in the game space in which the plurality of characters appear, an image generator that generates a replay image to be displayed on a display based on the acquired replay data, and a selector that selects one or more characters from among the plurality of characters as a focus character based on a selection operation on an operator by the user, and in which the image generator generates the replay image in a display format for the focus character.

According to the respective embodiments of the present application, one or more problems are solved.

BRIEF DESCRIPTION OF THE DRAWINGS

FIGS. 20A to 20C are diagrams respectively illustrating an example of a header code, a replay code, and an end code constituting the replay data corresponding to at least one of the embodiments of the invention.

FIG. 21 is a flowchart illustrating another example of the replay processing corresponding to at least one of the embodiments of the invention.

FIG. 22 is a flowchart illustrating another example of the data generation processing corresponding to at least one of the embodiments of the invention.

DESCRIPTION OF EMBODIMENTS

Figure 1:
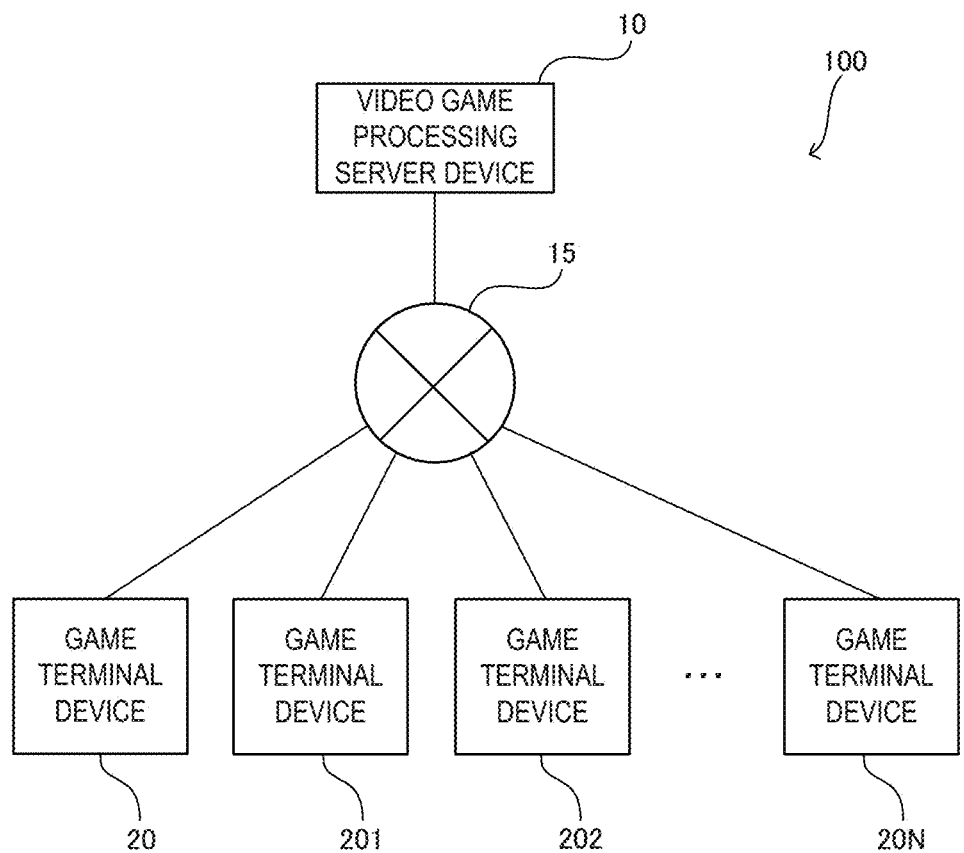
FIG. 1 is a block diagram illustrating an example of a configuration of a video game processing system corresponding to at least one of the embodiments of the invention.
Figure 2:
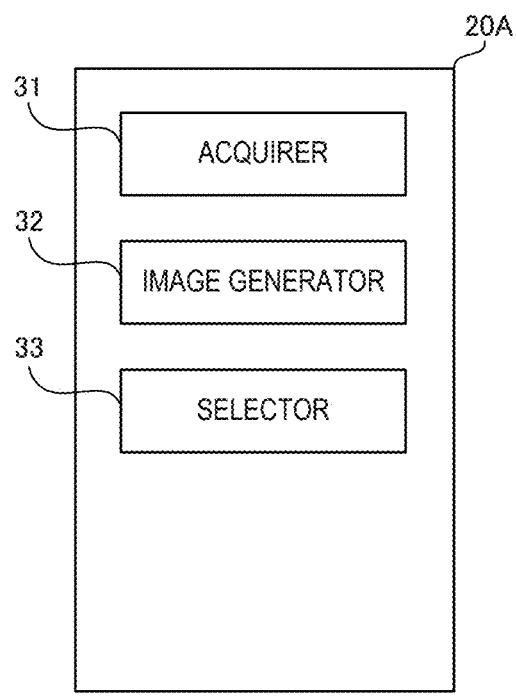
FIG. 2 is a block diagram illustrating a configuration of a game terminal device corresponding to at least one of the embodiments of the invention.

Hereinafter, examples of embodiments of the invention will be described referring to the drawings. In the examples of the embodiments described below, various components may be appropriately combined with each other within a range without contradiction. The content described as an example of one embodiment may be omitted in another embodiment. Description of an operation and processing not related to a feature of each embodiment may be omitted. The order of various kinds of processing constituting various flows described below may be appropriately changed within a range without contradiction in processing content thereof.

First Embodiment

FIG. 1 is a block diagram illustrating an example of a configuration of a video game processing system 100 according to an embodiment of the invention. As illustrated in FIG. 1, the video game processing system 100 includes a video game processing server device 10 and game terminal devices 20 and 201 to 20N (N is any integer number) used by each of a plurality of users (players) who play a video game. The video game processing server device 10 and the plurality of game terminal devices 20 and 201 to 20N are respectively connected to a communication network 15 such as the Internet. The configuration of the video game processing system 100 is not limited to the configuration described above. For example, the video game processing system 100 may have a configuration in which a single game terminal device is used by a plurality of players, or a configuration in which a plurality of video game processing server devices are provided. The video game processing system 100 may be constituted only with a game terminal device not including a video game processing server device.

The video game processing system 100 has various functions for executing a video game in which a plurality of characters including a user's player character appear in a game space. The video game processing system 100 has various functions of reproducing (replaying) play contents of the user who has already ended in the game space in which a plurality of characters including the user's player character appear. By executing the replay, images (replay images) reproducing the play contents are displayed on displays of the game terminal devices. Hereinafter, an image in the game space in which the play content already played by the user has been reproduced is referred to as a replay image, and the image in the game space in which the user is playing is referred to as a game image.

Further, in the example of this embodiment, when a focus character is selected, the replay image is displayed in a display format for the focus character. The focus character is a character to watch from among a plurality of characters appearing in the game space in the replay image. During replay execution, the user can select one or more characters among a plurality of characters appearing in the game space in the replay image as the focus character by operating an operator.

The video game processing server device 10 is managed by an administrator of the video game processing system 100 and has various functions for providing information on the video game to the game terminal devices 20 and 201 to 20N. For example, the video game processing server device 10 receives movement (position) information and the like of the player character of each user from the user (game terminal device), and provides information (movement information of other player characters and the like) on the video game for causing the game terminal devices 20 and 201 to 20N to progress the game. In the example of this embodiment, the video game processing server device 10 is constituted with an information processing apparatus such as a WWW server for providing information on a video game and has a database for storing various information, but the video game processing server device 10 has a general configuration and thus, description thereof here will be omitted.

Each of the plurality of game terminal devices 20 and 201 to 20N is managed by a user who plays a video game, and is constituted with a communication terminal, for example, a stationary game device, a personal computer, a mobile phone terminal, a personal digital assistants (PDA), a portable game device, or the like, which is capable of generating the replay image by execution of replay.

Each of the game terminal devices 20 and 201 to 20N is constituted with an operation device (operator), a storage such as a hard disk drive (HDD), a controller constituted with a CPU or the like for generating images of a plurality of items, and a display device (display) for displaying the image, and the like, but a detailed description thereof will be omitted. In addition, software (game program) for executing the replay of the embodiment of the invention is stored in the storages of the game terminal device 20 and 201 to 20N.

Next, a configuration of a game terminal device 20A which is an example of the configuration of the game terminal device 20 will be described. The game terminal device 20A includes at least an acquirer (acquisition function) 31, an image generator (image generation function) 32, and a selector (selection function) 33 for executing the replay by executing the game program stored in the storage by the selector 33. Since the other game terminal devices 201 to 20N have the same configuration, the description thereof will be omitted here.

The acquirer 31 acquires replay data for reproducing the play contents of the user who has already ended in the game space in which a plurality of characters including the user's character appear. The user is not limited to a user who requested execution of the replay. The acquirer 31 acquires the replay data from, for example, the storage of the game terminal device 20A.

Based on the acquired replay data, the image generator 32 generates a replay image to be displayed on the display of the game terminal device 20A. In a case where the focus character is selected, the image generator 32 generates the replay image in a display format for the focus character. The selector 33 selects one or more characters from the plurality of characters included in the replay data as the focus character, based on a selection operation on the operator by the user.

Next, the operation of the video game processing system 100 (system 100) of this embodiment will be described.

Figure 3:
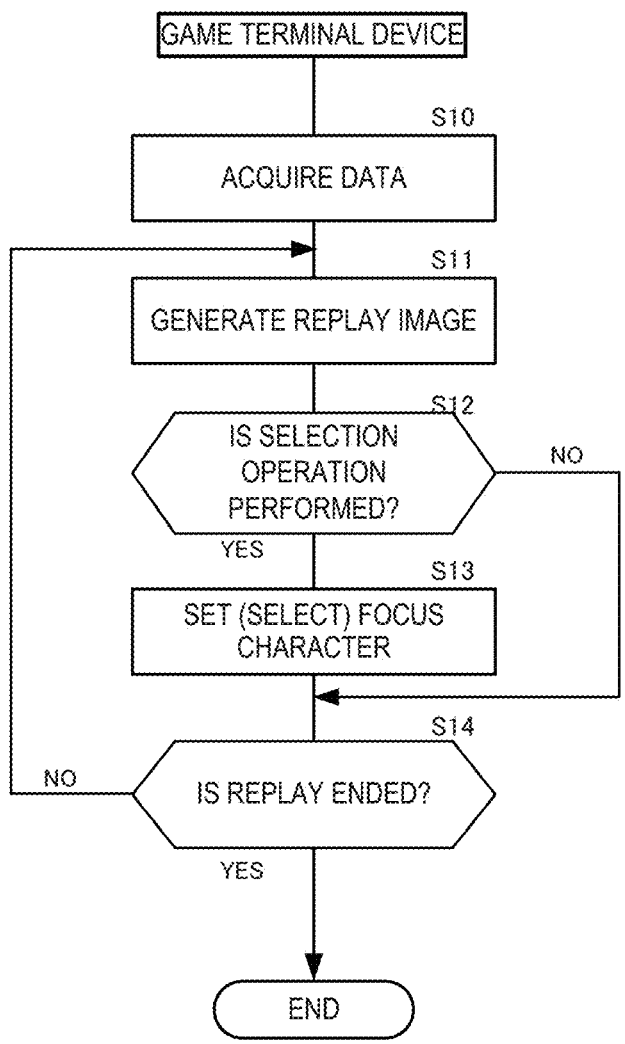
FIG. 3 is a flowchart illustrating an example of replay processing corresponding to at least one of the embodiments of the invention.

FIG. 3 is a flowchart illustrating an example of replay processing executed by the system 100. In the replay processing in the example of this embodiment, processing of generating a replay image based on the replay data is performed. Hereinafter, a case where the game terminal device 20A executes the replay processing will be described as an example.

The replay processing of the example of this embodiment is executed, for example, in a case where a request operation of replay execution to the operator is performed by the user.

In the replay processing, the game terminal device 20A acquires the replay data (Step S10). For example, the game terminal device 20A acquires the replay data designated by the user's operation from the storage. Next, the game terminal device 20A generates a replay image based on the acquired replay data (Step S11). The game terminal device 20A generates, for example, a replay image for one frame. The generated replay image is displayed on the display. In a case where the focus character is set in processing of Step S13, the replay image is generated in the display format for the focus character. Since the replay image is generated according to a general configuration, a detailed description thereof will be omitted.

Next, the game terminal device 20A determines whether or not a selection operation of the focus character is performed by the user (Step S12). In a case where the selection operation is not performed (NO in Step S12), the game terminal device 20A proceeds to processing of Step S14. On the other hand, in a case where when the selection operation is performed (YES in Step S12), the game terminal device 20A sets (selects) the focus character based on the selection operation (Step S13). After the focus character is set, the replay image is generated in the display format for the focus character in image generation processing of Step S11.

Thereafter, the game terminal device 20A determines whether generation of the replay image is ended (Step S14). In other words, it is determined whether or not reproduction of the play contents is ended to the end. For example, in a case where the generation of the replay image is completed until information indicating the end included in the replay data is reached, the game terminal device 20A determines that the generation of the replay image is ended. In a case where it is determined that the generation of the replay image is not ended (NO in Step S14), the game terminal device 20A returns to processing of Step S11. On the other hand, in a case where it is determined that the generation of the replay image is ended (YES in Step S14), the game terminal device 20A ends the replay processing.

As described above, as one aspect of the first embodiment, since the game terminal device 20A is configured to include the acquirer 31, the image generator 32, and the selector 33, the replay image is generated in the display format for the character (focus character) the user wants to watch. Accordingly, in the replay image, the motion (action) and the like of the focus character can be ascertained in more detail. With this configuration, for example, in a case where player characters of a plurality of users constituting one party exist in the game space in the replay image, motion of each player character can be ascertained in detail, and the motion of each player character in a cooperative play by the plurality of users can be used as a reference for future play.

In the example of the first embodiment described above, the game terminal device 20A executes a game program to generate the replay image, but the invention is not particularly limited thereto. Instead of the game terminal device 20A, the game processing server device 10 may be configured to include the acquirer 31, the image generator 32, and the selector 33. In this case, the replay data may be stored in the storage of the server device 10, for example. A plurality of server devices may cooperate to execute the game program, and the server and the terminal device may cooperate to execute the game program.

Figure 4:
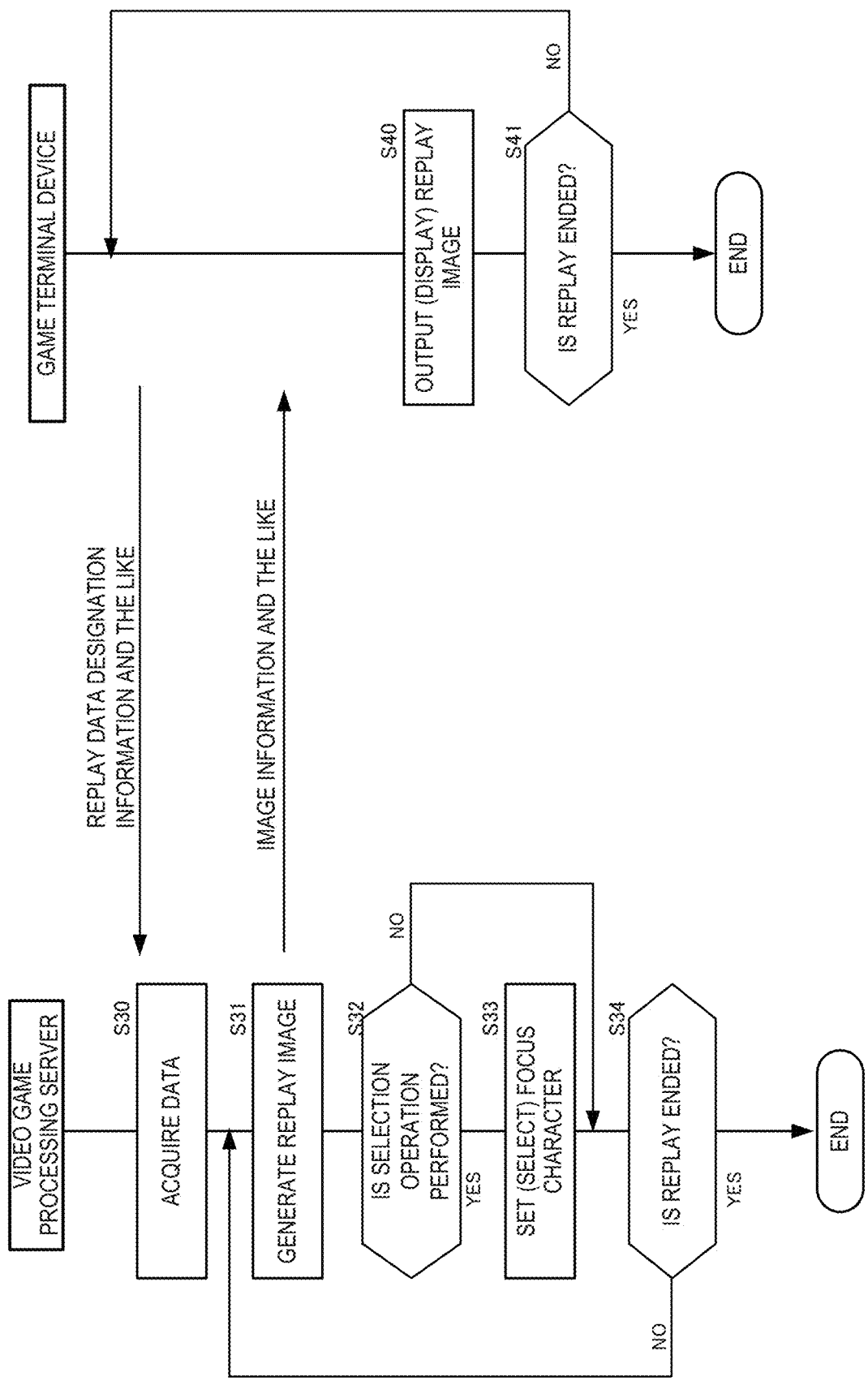
FIG. 4 is a flowchart illustrating an example of an operation in a case where a video game processing server device corresponding to at least one of the embodiments of the invention executes the replay processing.

FIG. 4 is a flowchart illustrating an example of the operations of the video game processing server device 10 (server 10) and the game terminal device 20 in a case where the video game processing server device 10 executes the replay processing illustrated in FIG. 3.

In the replay processing, the server 10 acquires the replay data (Step S30). For example, the server 10 receives the operation information designating the replay data from the game terminal device 20, and acquires the replay data corresponding to the operation information from the storage.

Next, the server 10 generates a replay image based on the acquired replay data (Step S31). For example, the server 10 generates the replay image for one frame. The server 10 transmits image information of the generated replay image to the game terminal device 20. Until the game is ended (YES in Step S41), the game terminal device 20 outputs the replay image (displays the replay image on the display) based on the received image information (Step S40). An arbitrary configuration can be adopted as a data format of the image information of the replay image to be transmitted to the game terminal device.

Next, the server 10 determines whether or not a focus character selection operation is performed by the user (Step S32). In a case where it is determined that the selection operation is not performed (NO in Step S32), the server 10 proceeds to processing of Step S34. On the other hand, in a case where it is determined that the selection operation is performed (YES in Step S32), the server 10 sets (selects) the focus character based on the selection operation (Step S33). After the focus character is set, the replay image is generated in the display format for the focus character in image generation processing in Step S31.

Thereafter, the server 10 determines whether or not generation of the replay image is ended (Step S34). In a case where it is determined that generation of the replay image is not ended (NO in Step S34), the server 10 returns to the processing of Step S31. On the other hand, in a case where it is determined that the generation of the replay image is ended (YES in Step S34), the server 10 ends the replay processing.

The "replay data" described above is not image data but data for reproducing the play contents of the user, and an arbitrary data format can be adopted. For example, a configuration in which a plurality of replay codes are disposed between the header code and the end code may be adopted. In the header code, information such as a game space, an enemy character, and the like for generating a game (content) to be played by the user is stored. In the replay code, movement (position) information and the like of each character appearing in the game space in units of one frame are stored. The replay code is disposed in chronological order from the header code toward the end code.

Generation of replay data may be performed by the server 10 or the game terminal device 20. The preservation place of the replay data is not particularly limited as long as a configuration in which the server 10 or the game terminal device 20 can acquire the replay data is available. Further, as a game played by a user targeted for replay data, a game of any genre such as an action game, a role playing game, a breeding game or the like may be adopted.

The "player character" described above is an object, is not limited to an object of a human type, but may be an object operated by the user. As the player character, for example, an object of a car, an object of a robot on which a person boards, and the like are also applicable.

In the "plurality of characters" described above, for example, a player character that each user operates and a non-player character such as the enemy character that is not operated by the user and the like are included.

As the display format for the focus character described above, for example, there is a display format in which the focus character is imaged by a virtual camera with the focus character as a subject, in a game space of a three-dimensional virtual space. In this case, the replay image in which the focus character is positioned near the center is obtained. Further, there is a display format in which, for example, a marker image is displayed around the other character which is targeted as an attack target by the focus character. The attack target is another character selected as a target of attack by a character which is a focus character during play of a user's game (during game execution).

The "game system" described above is constituted with the server 10 and the game terminal device 20 and the like, but may be constituted with a single unit of the game terminal device.

Second Embodiment

Figure 5:
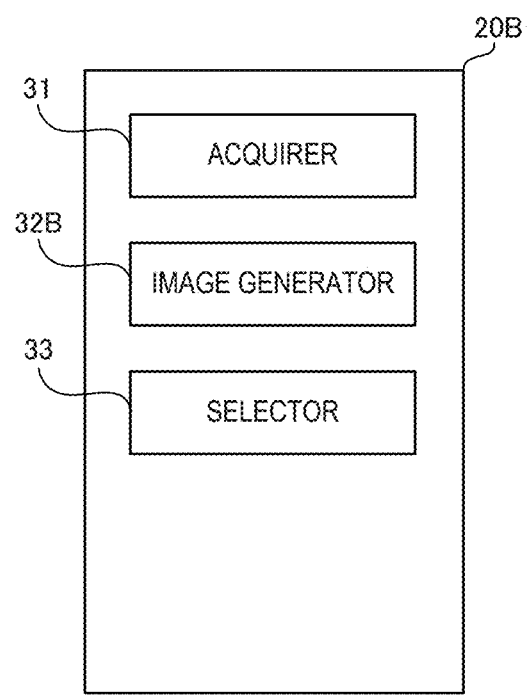
FIG. 5 is another block diagram illustrating the configuration of the game terminal device corresponding to at least one of the embodiments of the invention.

FIG. 5 is a block diagram illustrating a configuration of a game terminal device 20B which is an example of the game terminal device 20. In the example of this embodiment, the game terminal device 20B includes at least the acquirer 31, an image generator 32B, and the selector 33.

The acquirer 31 acquires replay data for reproducing play contents of the user who has already ended in the game space in which the plurality of characters including the user's player character appear. Based on the acquired replay data, the image generator 32B generates a replay image to be displayed on a display of the game terminal device 20B. In a case where the focus character is selected, the image generator 32B generates the replay image in the display format for the focus character. In the example of this embodiment, the image generator 32B generates a replay image that displays information specifying another character associated with the focus character as the display format for the focus character.

The selector 33 selects one or more characters from among the plurality of characters included in the replay data as the focus character based on the selection operation on the operator of the user.

Figure 6:
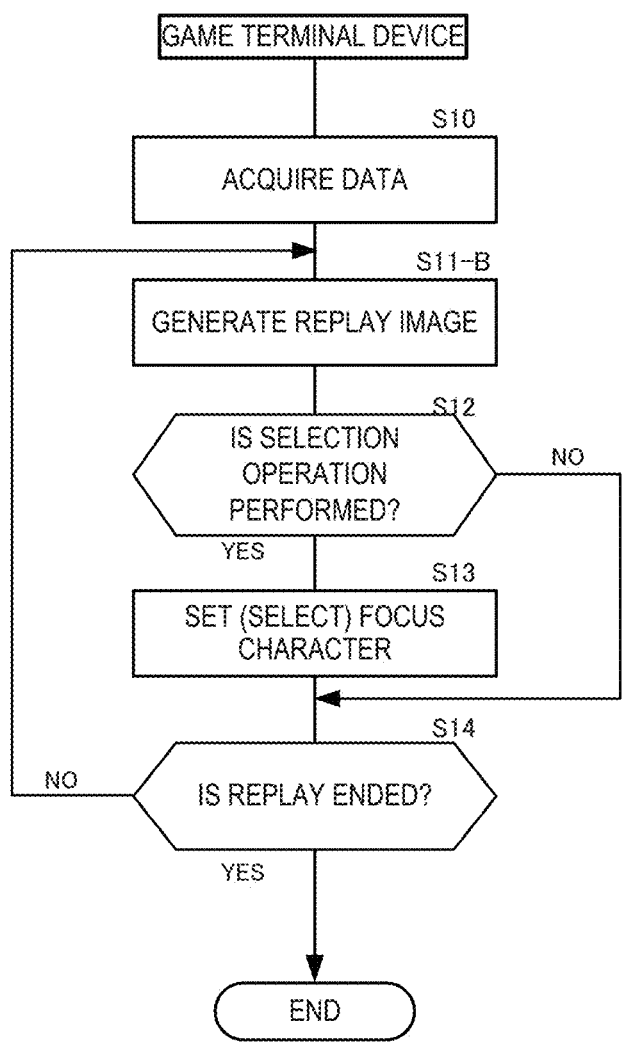
FIG. 6 is a flowchart illustrating another example of the replay processing corresponding to at least one of the embodiments of the invention.

FIG. 6 is a flowchart illustrating an example of replay processing executed by a system 100B which is an example of the system 100. In the replay processing in the example of this embodiment, processing of generating the replay image based on the replay data is performed. Hereinafter, a case where the game terminal device 20B executes the replay processing will be described as an example. Description of the flowchart illustrating the operation of the server 10 will be omitted from the viewpoint of avoiding redundant description.

The replay processing of the example of this embodiment is executed, for example, in a case where a request operation of replay execution to the operator is performed by the user.

In the replay processing, the game terminal device 20B acquires replay data (Step S10). For example, the game terminal device 20B acquires the replay data specified by the user's operation from the storage. Next, the game terminal device 20B generates a replay image based on the acquired replay data (Step S11-B). The game terminal device 20B generates, for example, the replay image for one frame. The generated replay image is displayed on the display. In a case where the focus character is set in processing of Step S13, a replay image for displaying information, which specifies other characters associated with the focus character, as the display format for the focus character is generated.

Next, the game terminal device 20B determines whether or not a selection operation of the focus character is performed by the user (Step S12). In a case where it is determined that the selection operation is not performed (NO in Step S12), the game terminal device 20B proceeds to processing of Step S14. On the other hand, in a case where it is determined that the selection operation is performed (YES in Step S12), the game terminal device 20B sets (selects) the focus character based on the selection operation (Step S13). After the focus character is set, the replay image is generated in the display format for the focus character in image generation processing in Step S11-B.

Thereafter, the game terminal device 20B determines whether generation of the replay image is ended (Step S14). In a case where it is determined that generation of the replay image is not ended (NO in Step S14), the game terminal device 20B returns to processing of Step S11-B. On the other hand, in a case where it is determined that generation of the replay image is ended (YES in Step S14), the game terminal device 20B ends the replay processing.

As described above, as one aspect of the second embodiment, since the game terminal device 20B is configured to include the acquirer 31, the image generator 32B, and the selector 33, the replay image is generated in the display format for the character (focus character) the user wants to watch. Accordingly, in the replay image, the motion and the like of the focus character can be ascertained in more detail. With this configuration, for example, in a case where player characters of a plurality of users constituting one party exist in the game space in the replay image, motion of each player character can be ascertained in detail, and the motion of each player character in a cooperative play by the plurality of users can be used as a reference for future play.

Further, since information for specifying another character associated with the focus character is displayed as the display format for the focus character, a relationship between the focus character and the other character can be ascertained from the replay image. For example, it is possible to ascertain from the replay image what kind of the other character is targeted as an attack target by the focus character at what timing.

The other character associated with the focus character described above corresponds to, for example, another character which is targeted as an attack target by the focus character. For example, the other character associated with the focus character described above corresponds to another character which is targeted as a recovery target for restoring parameters such as vital power by the focus character. The other character associated with the focus character described above corresponds to another character which is targeted as a target for raising an attack power parameter and defense force parameter by the focus character. Information for specifying another character associated with the focus character described above corresponds to, for example, the marker image to be displayed around the associated other character.

The replay data may include identification information for specifying another character associated with each character appearing in the game space.

Third Embodiment

In the example of this embodiment, a system 100C which is an example of the system 100 will be described. In the system 100C of the example of this embodiment, a video game where a plurality of characters including player characters of each of the plurality of users appear in the game space is executed.

Figure 7:
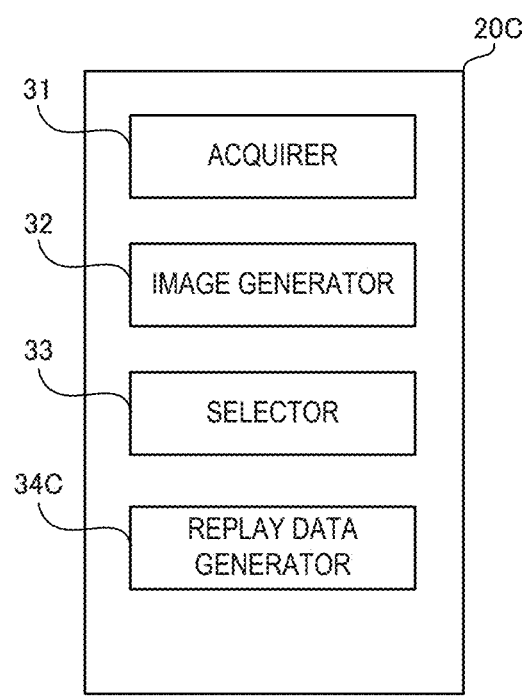
FIG. 7 is another block diagram illustrating the configuration of the game terminal device corresponding to at least one of the embodiments of the invention.

FIG. 7 is a block diagram illustrating a configuration of a game terminal device 20C which is an example of the game terminal device 20. In the example of this embodiment, the game terminal device 20C includes at least the acquirer 31, the image generator 32, the selector 33, and a replay data generator (replay data generation function) 34C.

The acquirer 31 acquires replay data for reproducing play contents of the user who has already ended in the game space in which a plurality of characters including the user's player character appear. Based on the acquired replay data, the image generator 32 generates a replay image to be displayed on a display of the game terminal device 20C. In a case where the focus character is selected, the image generator 32 generates the replay image in the display format for the focus character.

The selector 33 selects one or more characters from among the plurality of characters included in the replay data as the focus character based on the selection operation on the operator by the user.

The replay data generator 34C generates replay data and stores the replay data in the storage of the game terminal device 20C based on a request operation to the operator by the user. The generation of the replay data is performed during the game play (game execution) by the user in the game terminal device 20C. For example, in the case of the replay data having the configuration of the header code, the replay code, and the end code described above, the replay data generator 34C stores movement (position) information in units of one frame of each character appearing in the game space of the game being played and the like as the replay code.

For example, the server 10 may perform control for causing a game played by a plurality of users to progress. In this case, the server 10 receives the movement information and the like of the player character of each user from each game terminal device which is executing the game and generates information (game image generation information) for generating a game image in units of one frame. The game image generation information includes, for example, movement (position) information of each character and the like. Then, the server 10 transmits game image generation information to each of the game terminal devices that are executing the game. Each game terminal device generates a game image based on the game image generation information received from the server 10. Since progress control of the game is performed according to a general configuration, detailed description thereof will be omitted.

The replay data generator 34C may acquire necessary information from the received game image generation information and generate the replay data. Control for causing the game played by the user to progress may be performed by the server 10 or may be performed by the game terminal device 20C.

The replay data generator 34C changes information of a name of a player character of at least another user other than the user who performs the request operation, among the player characters included in the replay data, to predetermined information and generates the replay data. That is, replay data in which information that can specify another user other than the user who requested generation (storage) of replay data is deleted is generated.

For example, in a case where identification information of the user and various information of the player character are transmitted in association with each other from the server 10, the player character of another user is specified from the identification information of the user who performs the request operation.

Figure 8:
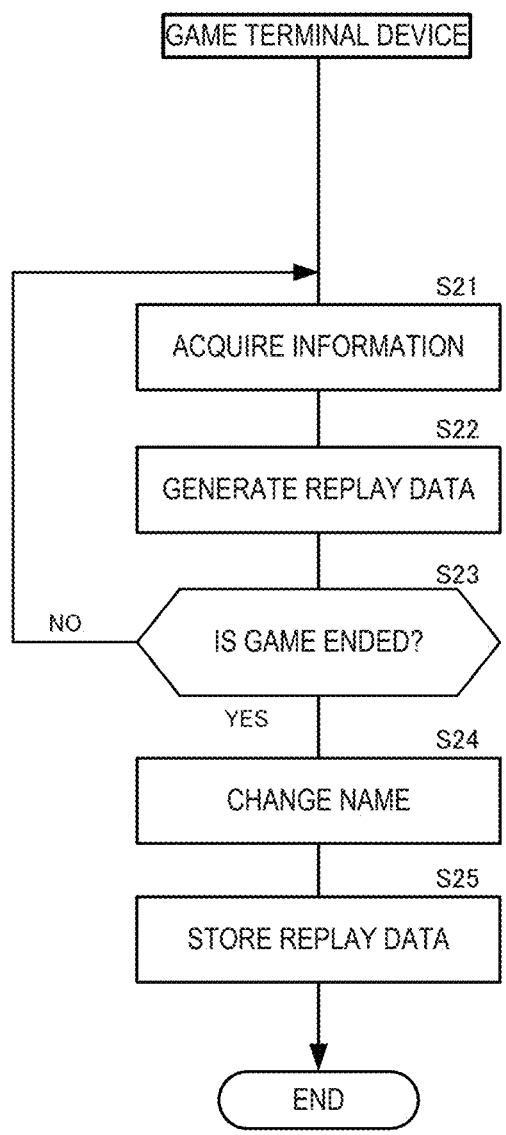
FIG. 8 is a flowchart illustrating an example of data generation processing corresponding to at least one of the embodiments of the invention.

FIG. 8 is a flowchart illustrating an example of data generation processing of replay executed by the system 100C. In the data generation processing in the example of this embodiment, processing in which replay data of a game being played is generated and stored in the storage is performed. Hereinafter, a case where the game terminal device 20C executes the data generation processing will be described as an example. Description will be on the assumption that the user of the game terminal device 20C performs a request operation of generating the replay data. The replay processing executed by the system 100C is the same as the FIG. 3 and the like described above, and the description thereof will be omitted.

The data generation processing of the example of this embodiment is executed, for example, in a case where the request operation of generating replay data for the operator is performed by the user at the start of play of the game.

In the data generation processing, the game terminal device 20C acquires information necessary for generating the replay data of each character including the player character (Step S21). As in the example described above, the game terminal device 20C may acquire information necessary for generating the replay data from game image generation information received from the server 10.

Next, the game terminal device 20C generates the replay data (Step S22). The game terminal device 20C generates, for example, data for one frame constituting the replay data.

The generated replay data may be temporarily stored in the RAM or the like until generation of entire replay data is completed.

Thereafter, the game terminal device 20C determines whether or not the game (content) that the user is playing is ended (Step S23). In a case where it is determined that the game terminal device 20C is not ended (NO in Step S23), the game terminal device 20C returns to processing of Step S21. On the other hand, in a case where it is determined that the game character is ended (YES in Step S23), the game terminal device 20C changes the name of the player character included in the replay data (Step S24). As described above, information of a name of a player character of another user other than the user who performs the request operation, among the player characters included in the replay data, is changed to predetermined information.

Thereafter, the game terminal device 20C stores the replay data in the storage (Step S25), and ends the data generation processing.

As described above, as one aspect of the third embodiment, since the game terminal device 20C is configured to include the acquirer 31, the image generator 32, the selector 33, and the replay data generator 34C, the replay image is generated in the display format for the character (focus character) the user wants to watch. Accordingly, in the replay image, the motion and the like of the focus character can be ascertained in more detail. With this configuration, for example, in a case where player characters of a plurality of users constituting one party exist in the game space in the replay image, motion of each player character can be ascertained in detail, and the motion of each player character in a cooperative play by the plurality of users can be used as a reference for future play.

Information of a name of a player character of at least another user other than the user who performs the request operation, among the player characters included in the replay data, is changed to predetermined information and the replay data is generated. Accordingly, it is difficult for other users included in the replay data to be specified. For that reason, for example, even in a case where the user who requested generation (storage) of replay data posted video generated from the replay data on a public WEB site or the like, there is little adverse effect on the other user.

The server 10 may execute data generation processing instead of the game terminal device 20C.

Figure 9:
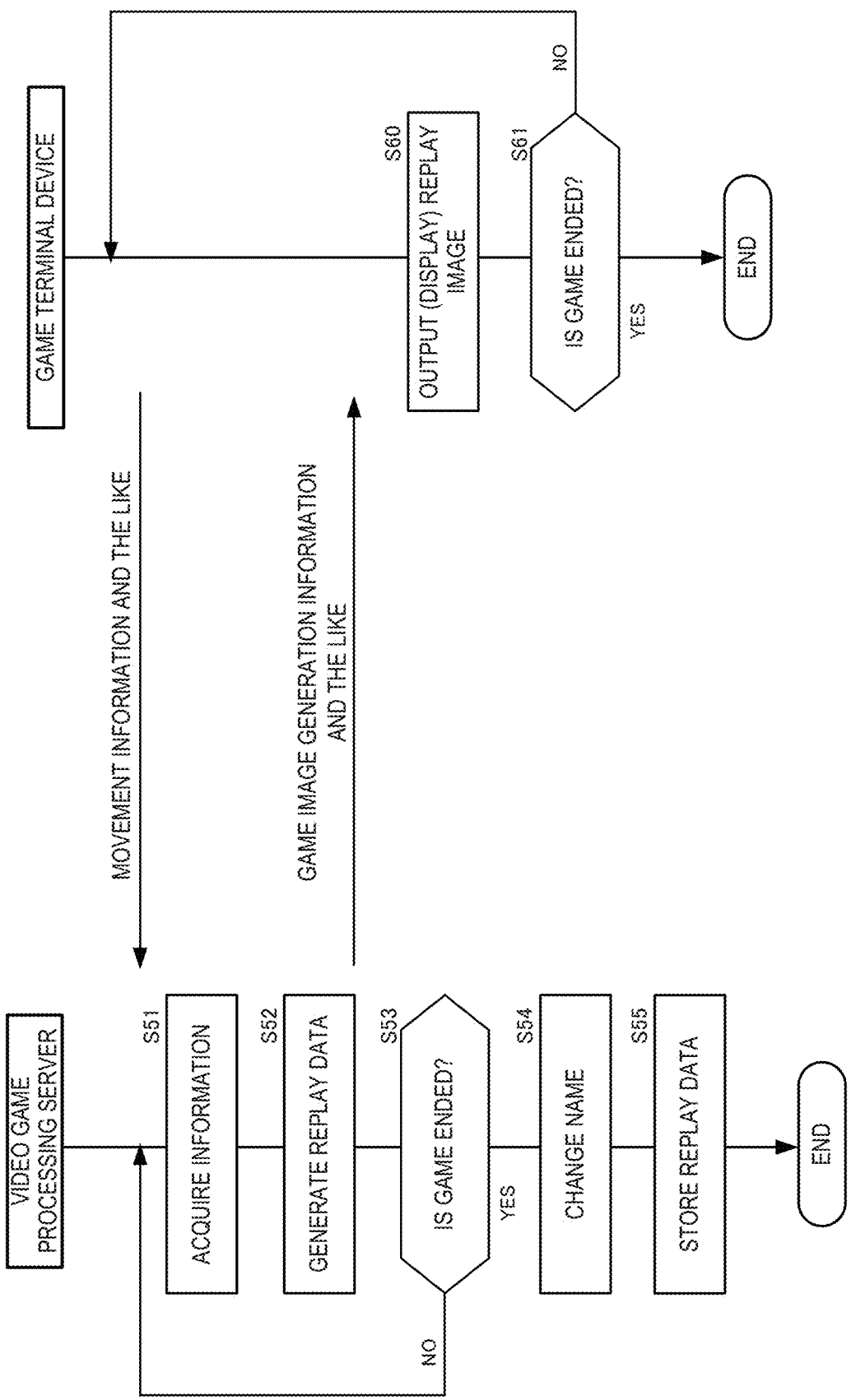
FIG. 9 is a flowchart illustrating an example of an operation in a case where the video game processing server device corresponding to at least one of the embodiments of the invention executes the data generation processing.

FIG. 9 is a flowchart illustrating an example of the operations of the server 10 and the game terminal device 20 in a case where the server 10 executes the data generation processing illustrated in FIG. 8. Description will be made on the assumption that the user of the game terminal device 20 performs the request operation.

In the data generation processing, the server 10 acquires information necessary for generating replay data of each character including a player character (Step S51). The server 10 may acquire information necessary for generation of the replay data from game image generation information to be transmitted to each game terminal device of a user who plays a game including the game terminal device 20, for example.

Next, the server 10 generates the replay data (Step S52). The server 10, for example, generates data for one frame constituting replay data. The generated replay data may be temporarily stored in the RAM or the like until generation of entire replay data is completed.

Thereafter, the server 10 determines whether or not the game (content) that the user is playing is ended (Step S53). In a case where it is determined that the game is not ended (NO in Step S53), the server 10 returns processing of Step S51. On the other hand, in a case where it is determined that the game is ended (YES in Step S53), the server 10 changes the name of the player character included in the replay data (Step S54). As described above, among the player characters included in the replay data, the information of the name of the player character of the other user than the user who performs the request operation is changed to predetermined information. For example, the server 10 may change the predetermined information based on the identification information of the user acquired together with the request operation.

Thereafter, the server 10 stores the replay data in the storage (Step S55), and ends the data generation processing.

The server 10 receives movement information and the like of the player character of each user from each game terminal device that is executing the game, and generates game image generation information in units of one frame. Then, the server 10 transmits the game image generation information to each of the game terminal devices that are executing the game including the game terminal device 20. The game terminal device 20 outputs (displays on the display) a game image based on the received image information (Step S60) until the game being played is ended (YES in Step S61).

The server may execute only the data generation processing as described above and the game terminal device may execute the replay processing. In this case, the generated replay data may be transmitted from the server to the game terminal device.

The "predetermined information" described above may have any configuration as long as it is information different from the name of the player character to be changed. For example, the information of the name of the player character may be changed to a name indicating a tribe (for example, dwarf) of a player character or occupation (for example, swordsman). Further, it is not necessary to change the player character whose name is not included in the replay data.

The timing of changing the information on the name of the player character to predetermined information may be performed at any timing until the replay processing is performed. For example, changing of the information on the name of the player character may be performed together with the generation of the replay data in processing of Step S22.

Fourth Embodiment

In the example of this embodiment, a system 100D which is an example of the system 100 will be described. In the system 100D of the example of this embodiment, a video game in which a plurality of characters including the player character of each of a plurality of users appear in the game space is executed.

Figure 10:
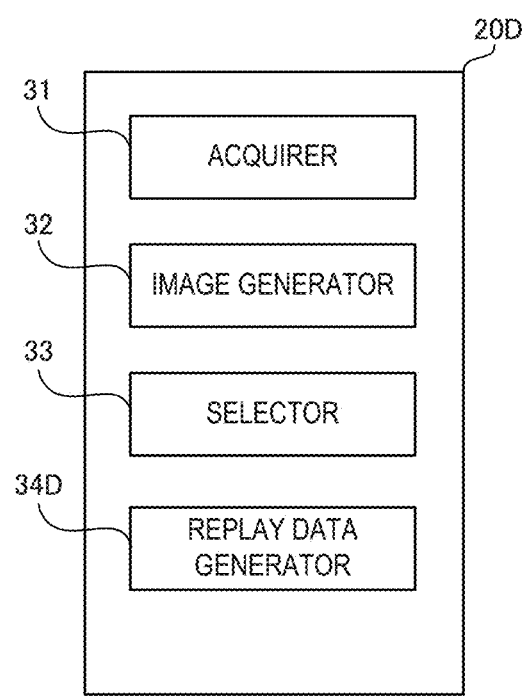
FIG. 10 is another block diagram illustrating the configuration of the game terminal device corresponding to at least one of the embodiments of the invention.

FIG. 10 is a block diagram illustrating a configuration of a game terminal device 20D which is an example of the game terminal device 20. In the example of this embodiment, the game terminal device 20D includes at least the acquirer 31, the image generator 32, the selector 33, and a replay data generator 34D.

The acquirer 31 acquires replay data for reproducing play contents of the user who has already ended in the game space in which a plurality of characters including the user's player character appear. Based on the acquired replay data, the image generator 32 generates a replay image to be displayed on a display of the game terminal device 20D. In a case where the focus character is selected, the image generator 32 generates the replay image in the display format for the focus character.

The selector 33 selects one or more characters from among the plurality of characters included in the replay data as the focus character, based on the selection operation on the operator by the user.

The replay data generator 34D generates replay data and stores the replay data in the storage of the game terminal device 20D based on a request operation to the operator by the user. Generation of the replay data is performed during the game play (game execution) by the user in the game terminal device 20D. For example, in the case of the replay data having the configuration of the header code, the replay code, and the end code, the replay data generator 34D stores movement (position) information in units of one frame of each character appearing in the game space of the game being played and the like as the replay code.

For example, the server 10 may perform control for causing a game played by a plurality of users to progress. In this case, the server 10 receives the movement information and the like of the player character of each user from each game terminal device which is executing the game and generates information (game image generation information) for generating a game image in units of one frame. The game image generation information includes, for example, movement (position) information of each character and the like. Then, the server 10 transmits game image generation information to each of the game terminal devices that are executing the game. Each game terminal device generates a game image based on the game image generation information received from the server 10. Since progress control of the game is performed according to a general configuration, detailed description thereof will be omitted.

The replay data generator 34D may acquire necessary information from the received game image generation information and generate the replay data. Control for causing the game played by the user to progress may be performed by the server 10 or may be performed by the game terminal device 20D.

The replay data generator 34D generates replay data in a case where permission of another user other than the user who performs the request operation, among the users of the player characters included in the replay data, is acquired. Accordingly, even if a certain user performs a request operation, replay data is not generated unless permission of other users who play the game is given.

For example, the replay data generator 34D may acquire permission to generate replay data from each game terminal device that executes the game via the server 10 at the start of game execution.

Figure 11:
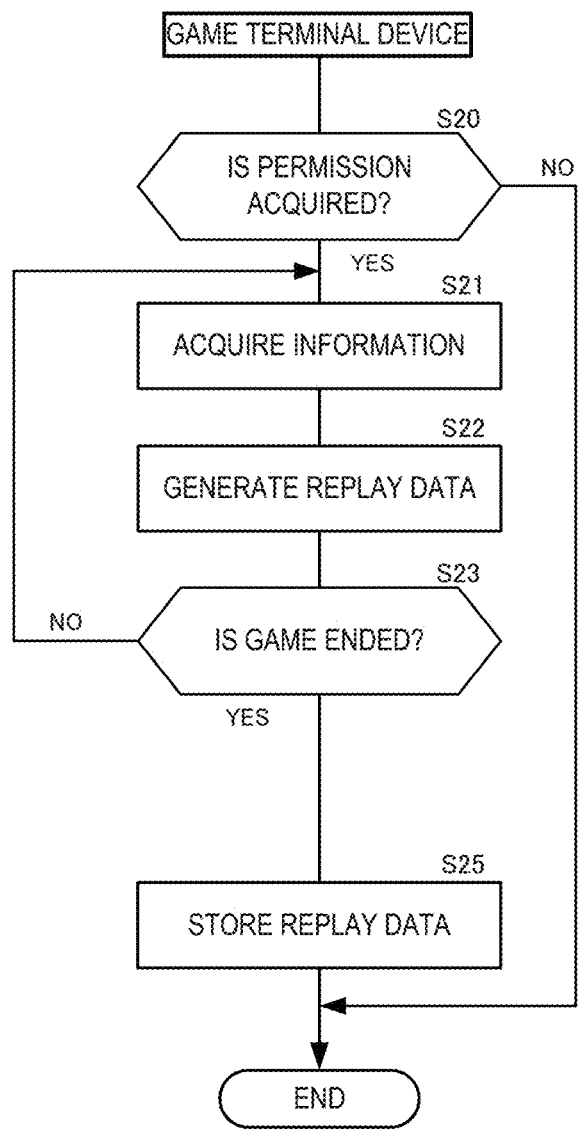
FIG. 11 is a flowchart illustrating another example of the data generation processing corresponding to at least one of the embodiments of the invention.

FIG. 11 is a flowchart illustrating an example of data generation processing of replay executed by the system 100D. In the data generation processing in the example of this embodiment, processing is performed in which replay data of a game being played is generated and stored in the storage. Hereinafter, a case where the game terminal device 20D executes the data generation processing will be described as an example. Description will be on the assumption that the user of the game terminal device 20C performs a request operation of generating the replay data. The replay processing executed by the system 100D is the same as that of FIG. 3 described above and thus, description thereof will be omitted.

The data generation processing of the example of this embodiment is executed, for example, in a case where a request operation of generating replay data to the operator is performed by the user at the start of play of the game.

In the data generation processing, the game terminal device 20D determines whether or not permission of other users is acquired (Step S20). As described above, it is determined whether permission is obtained from all of the other users (game terminal devices) other than the user (game terminal device 20D) who performs the request operation, among the game terminal devices that execute the game.

In a case where it is determined that all permissions are not acquired (NO in Step S20), the game terminal device 20D ends the data generation processing. On the other hand, in a case where it is determined that all permissions are acquired (YES in Step S20), the game terminal device 20D acquires information necessary for generating replay data of each character including the player character (Step S21). Next, the game terminal device 20D generates replay data (Step S22). The game terminal device 20D generates, for example, data for one frame constituting the replay data.

Thereafter, the game terminal device 20D determines whether or not the game (content) that the user is playing is ended (Step S23). In a case where it is determined that the game is not ended (NO in Step S23), the game terminal device 20D returns to processing of Step S21. On the other hand, in a case where it is determined that the game is ended (YES in Step S23), the game terminal device 20D stores the replay data in the storage (Step S25) and ends the data generation processing.

As described above, as one aspect of the fourth embodiment, since the game terminal device 20D is configured to include the acquirer 31, the image generator 32, the selector 33, and the replay data generator 34C, the replay image is generated in the display format for the character (focus character) the user wants to watch. Accordingly, in the replay image, the motion and the like of the focus character can be ascertained in more detail. With this configuration, for example, in a case where player characters of a plurality of users constituting one party exist in the game space in the replay image, motion of each player character can be ascertained in detail, and the motion of each player character in a cooperative play by the plurality of users can be used as a reference for future play.

Replay data is generated when permission of at least another user than the user who performs the request operation is given among the users of the player characters included in the replay data. Accordingly, it is possible to prevent replay data from being generated in a state where other users do not recognize.

The server 10 may execute data generation processing instead of the game terminal device 20D.

Figure 12:
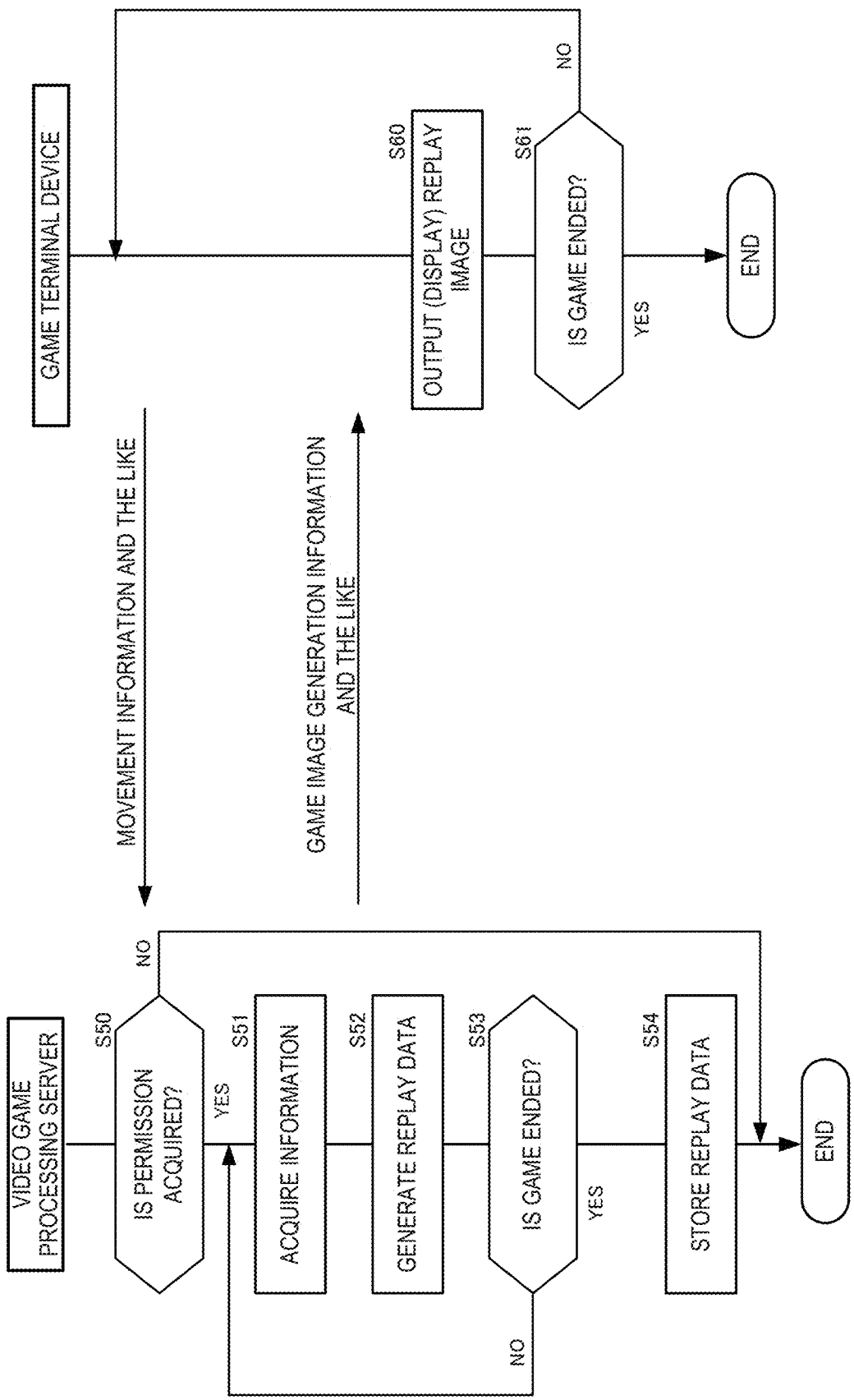
FIG. 12 is a flowchart illustrating another example of the operation in a case where the video game processing server device corresponding to at least one of the embodiments of the invention executes the data generation processing.

FIG. 12 is a flowchart illustrating an example of the operations of the server 10 and the game terminal device 20 in a case where the server 10 executes the data generation processing illustrated in FIG. 11. Description will be made on the assumption that the user of the game terminal device 20 performs the request operation.

In the data generation processing, the server 10 determines whether or not permission of another user is acquired (Step S50). The server 10 determines whether or not permission is obtained from all of the other users (game terminal devices) other than the user (game terminal device 20) who has performed the request operation among the game terminal devices that execute the game.

In a case where it is determined that all permissions are not acquired (NO in Step S50), the server 10 ends the data generation processing. On the other hand, in a case where it is determined that all permissions are acquired (YES in Step S50), the server 10 acquires information necessary for generating replay data of each character including the player character (Step S51). Next, the server 10 generates replay data (Step S52). The server 10, for example, generates data for one frame constituting the replay data.

Thereafter, the server 10 determines whether or not the game (content) that the user is playing is ended (Step S53). In a case where it is determined that the game is not ended (NO in Step S53), the server 10 returns to processing of Step S51. On the other hand, in a case where it is determined that the game is ended (YES in Step S53), the server 10 stores the replay data in the storage (Step S25), and ends the data generation processing.

The server 10 receives movement information and the like of the player character of each user from each game terminal device that is executing the game, and generates game image generation information in units of one frame. Then, the server 10 transmits the game image generation information to each of the game terminal devices that are executing the game including the game terminal device 20. The game terminal device 20 outputs a game image (displays a game image on the display) based on the received image information (Step S60) until the game being played is ended (YES in Step S61).

The server may execute only the data generation processing as described above and the game terminal device may execute the replay processing. In this case, the generated replay data may be transmitted from the server to the game terminal device.

As in the example of the third embodiment described above, a configuration in which replay data is generated by changing the information on the name of the player character of another user other than the user who performs the request operation to predetermined information may be added.

Fifth Embodiment

Figure 13:
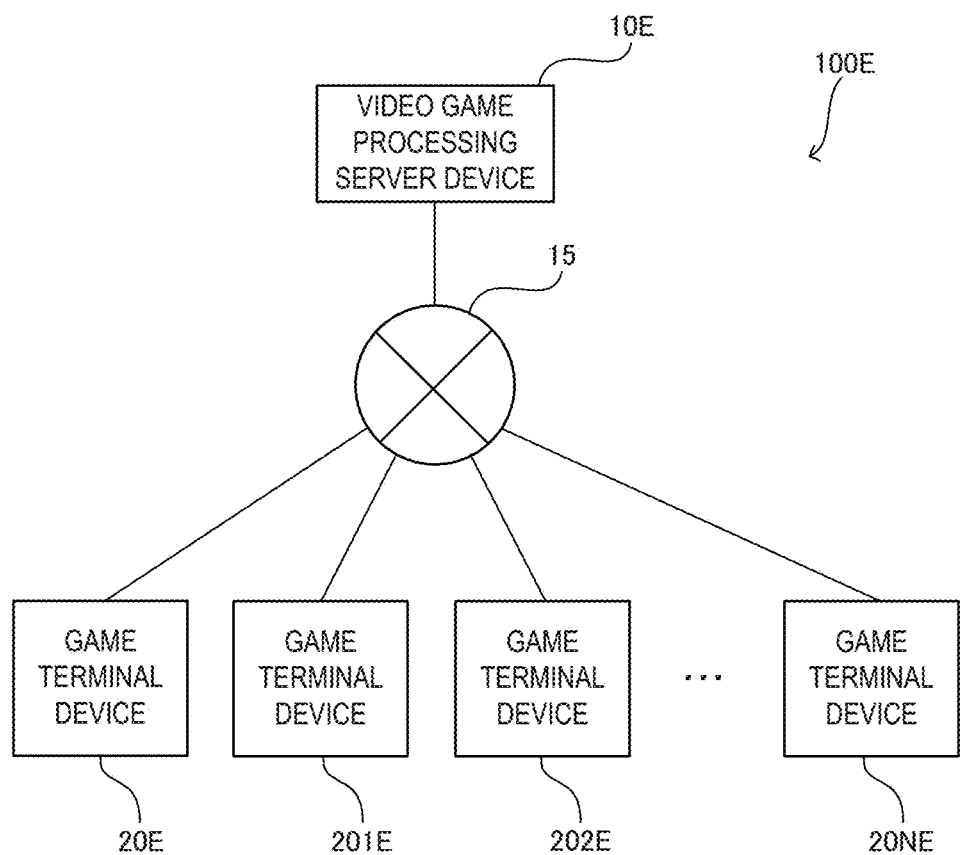
FIG. 13 is a block diagram illustrating another example of the configuration of the video game processing system corresponding to at least one of the embodiments of the invention.

FIG. 13 is a block diagram illustrating an example of a configuration of a video game processing system 100E which is an example of the system 100.

As illustrated in FIG. 13, the system 100E includes a server 10E which is an example of the server 10 and game terminals 20E and 201E to 20NE which are examples of the game terminal devices 20 and 201 to 20N. The game terminal devices 20E and 201E to 20NE are respectively used by a plurality of users (players) who play video games.

The server 10E and the plurality of game terminal devices 20E and 201E to 20NE are respectively connected to a communication network 15 such as the Internet. The configuration of the system 100E is not limited to thereto. For example, the system 100E may have a configuration in which a single user terminal device is used by a plurality of users, or a configuration in which a plurality of video game processing server devices are provided. The system 100E may be configured to include only the game terminal device not including the video game processing server device.

The system 100E has various functions for executing a video game in which a plurality of characters including player characters of each of a plurality of users appear in the game space. In the game of the example of this embodiment, one party composed of the player characters of each of the plurality of users and an enemy character which is the non-player character battle in the same (common) game space (including synchronized virtual space and asynchronous virtual space) which is a three-dimensional virtual space.

The party is formed by, for example, a player character of a user (host user) who creates a virtual bulletin board and recruits party members and a player character of a user (guest user) who responds to recruitment. That is, the user can refer to the bulletin board and participate a desired party. Then, in a case where the party members (player characters) to be a party are prepared, execution of a game (content) is started. That is, a game space based on the purpose of the content is generated, and each player character is disposed in the game space. Since the recruitment of party members and the contents of the game are general configurations, detailed description thereof will be omitted.

Figure 14:
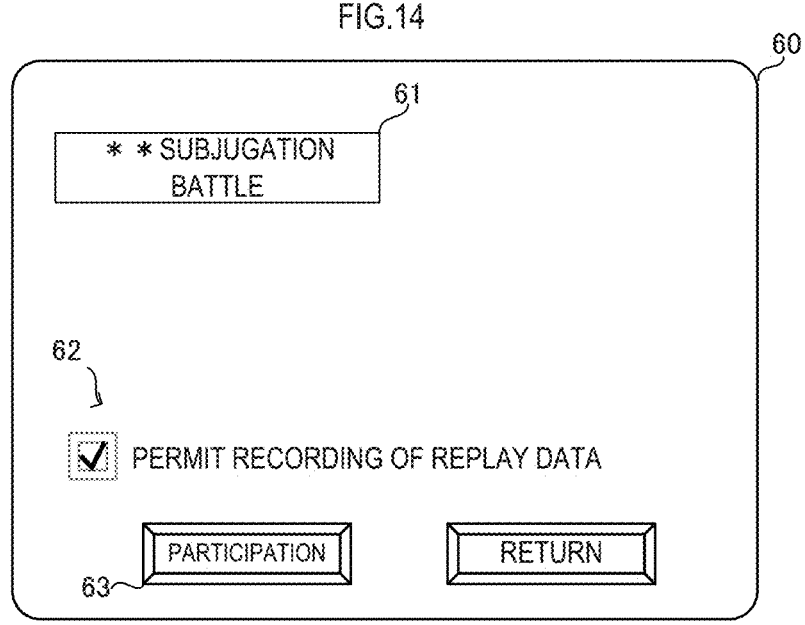
FIG. 14 is a view illustrating an example of a game image corresponding to at least one of the embodiments of the invention.

The bulletin board for recruiting the party is displayed on the display by the user's operation. FIG. 14 is a diagram illustrating an example of a game image of a bulletin board 60. An image of the bulletin board 60 includes display areas 61 and 62, a participation button 63, and the like. In the display area 61, the purpose of a game (content) scheduled to be played such as quests, dungeons and the like is displayed. In the display area 62, an image of a check box for receiving a check operation of permission to generate replay data and the like are displayed. The participation button 63 is an icon image for receiving a determination operation of participating in a party of a game (content) that is recruited on the bulletin board 60. In the case of permitting generation of replay data, the guest user may participate the party in a state where the check box is checked by operating the operator.

The system 100E has various functions of reproducing (replaying) play contents of a user who has already ended in the game described above. By executing the replay, an image (replay image) reproducing the play contents is displayed on the display of the game terminal device of the user who requested the replay.

In the example of this embodiment, in a case where the focus character is selected, the replay image is displayed in the display format for the focus character. During replay execution, the user can select one character from among a plurality of characters appearing in the game space in the replay image as the focus character by operating the operator.

Figure 15:
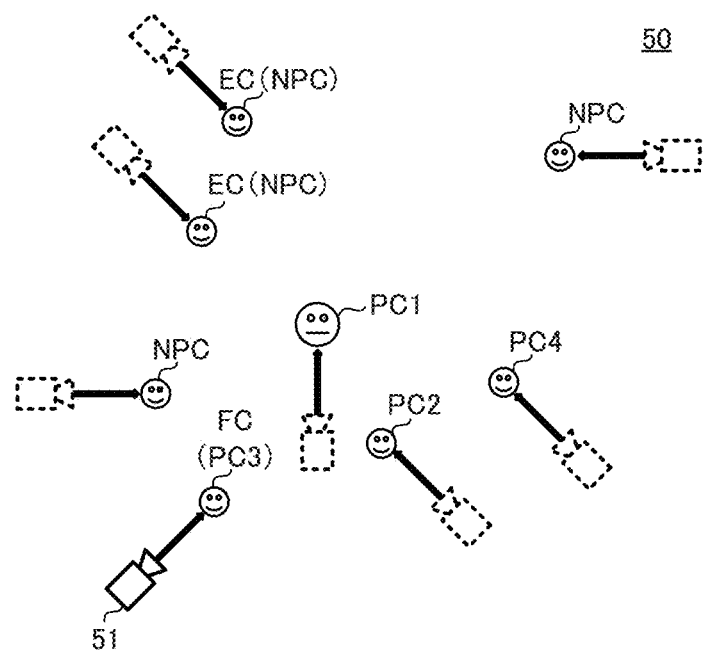
FIG. 15 is a plan view of a game space reproduced based on replay data corresponding to at least one of the embodiments of the invention.

FIG. 15 is a plan view of the game space 50 reproduced based on the replay data. In the game space 50, there are a plurality of player characters PC1 to PC4 and non-player characters NPC including the enemy character EC. The player character PC1 is a character operated by a user who performed a request operation of replay execution.

In the display format for the focus character, as illustrated in FIG. 15, in the game space of the three-dimensional virtual space, an image captured by the virtual camera 51 with the focus character FC as the subject becomes the replay image. In FIG. 15, the player character PC3 is in a state of being selected as the focus character FC. Then, in a case where the focus character FC is switched to another character, the virtual camera 51 also moves so as to make the switched another character (focus character FC) the subject.

In the example of this embodiment, the player character PC and the non-player character NPC can be selected as the focus character FC. As the non-player character NPC, besides the enemy character EC, fellow characters of the player character PC and the like are also included.

Figure 16:
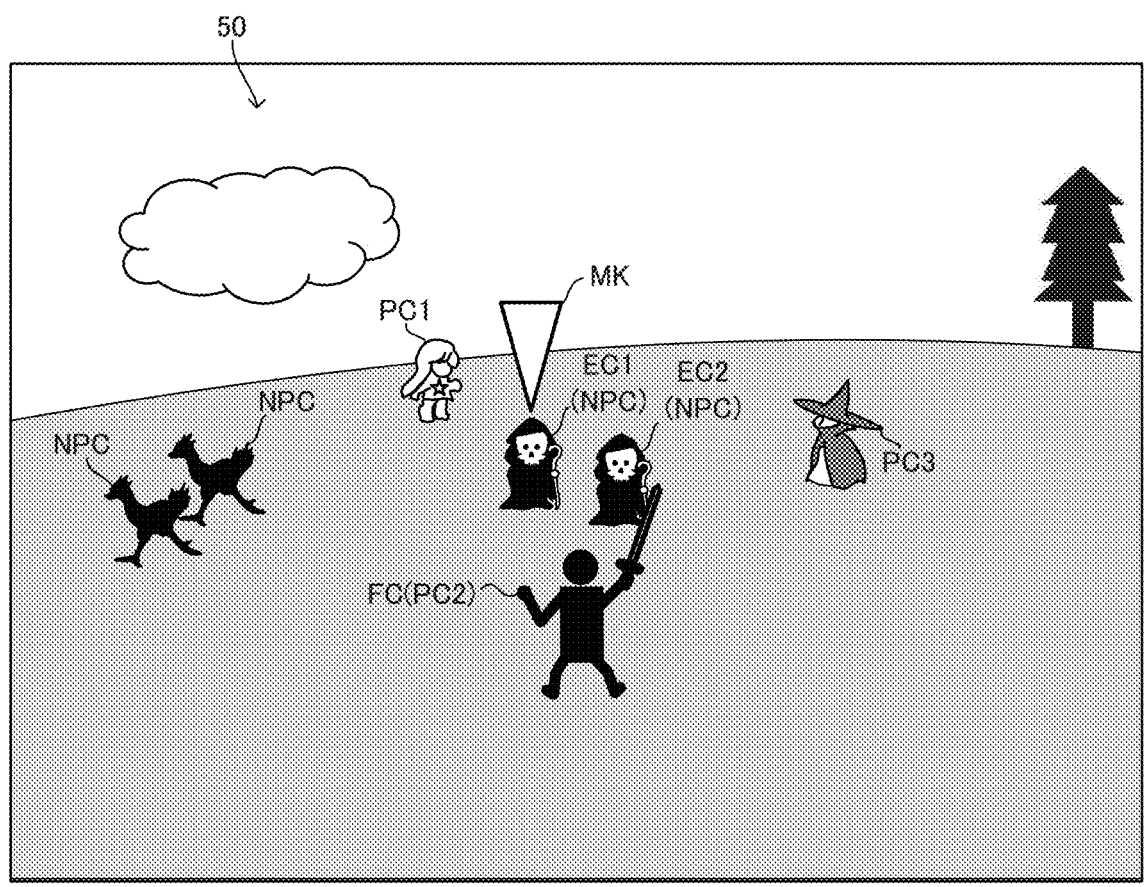
FIG. 16 is a view illustrating another example of the game image corresponding to at least one of the embodiments of the invention.

In the state where the focus character FC is selected, for example, as illustrated in FIG. 16, a replay image in which the focus character FC is positioned near the center is obtained. FIG. 16 illustrates a state in which the player character PC2 is selected as the focus character FC. The game space 50 illustrated in FIG. 15 and the game space 50 illustrated in FIG. 16 are different.

In the replay image, an image of a marker MK is displayed around other characters which are targeted as an attack target by the focus character FC. In FIG. 16, the image of the marker MK is displayed around an enemy character EC1. The enemy character EC1 is the attack target of the focus character (the player character PC2).

The attack target of the focus character in the replay image is an another character which are targeted as an attack target by the focus character FC during execution of the game. In the example of this embodiment, an attack target is also set even in enemy characters that are non-play characters.

In the example of this embodiment, only the host user can request generation of the replay data. Specifically, the host user (game terminal device) requests the server 10E to generate a bulletin board for recruiting the party together with setting for generating the replay data (request operation of generation of replay data). Generation of the replay data may not be limited to only the host user.

The server 10E is managed by an administrator of the video game processing system 100E and has various functions for providing information on the video game to the game terminal devices 20E and 201E to 20NE. For example, the server 10E receives movement information and the like of the player character of each user from the user (game terminal device) and transmits information on the video game for causing the game terminal devices 20E and 201E to 20NE to progress the game (movement information and the like of other player character).

Figure 17:
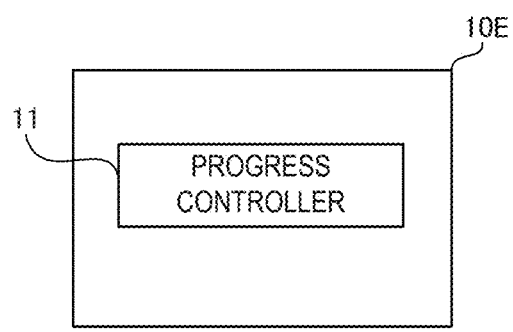
FIG. 17 is a block diagram illustrating a configuration of the video game processing server device corresponding to at least one of the embodiments of the invention.

FIG. 17 is a functional block diagram illustrating a configuration of the server 10E. The server 10E includes a storage such as an HDD (not illustrated) and a controller constituted with a CPU, and the like, and the controller controls progress of the video game by executing a game progress control program stored in the storage. The server 10E includes at least a progress controller 11E by executing the game progress control program. The server 10E has a general configuration for performing a video game such as the controller described above, the communicator, and the like, but description thereof will be omitted here.

The progress controller 11E controls matching for forming the party described above based on operation information such as party generation request, party participation request, and the like from each user. When formation of the party is completed, the progress controller 11 transmits permission information of generation of the replay data to the game terminal device of the host user.

Furthermore, the progress controller 11E controls progress of the game at a formed party. Specifically, the progress controller 11E receives operation information of each of the player characters constituting the party from the game terminal devices of the player characters constituting the party. The progress controller 11E generates operation information of the non-player character such as the enemy character, collects the operation information of each character, and generates packet data. The packet data is, for example, game image generation information for generating a game image for one frame. The progress controller 11E transmits the game image generation information to the game terminal device of the player character forming the party until the game is ended. The game terminal device generates the game image based on received game image generation information.

Each of the game terminal devices 20E and 201E to 20NE is constituted with an operation device (operator), a storage such as a hard disk drive (HDD), a controller constituted with a CPU or the like for generating images of a plurality of items, and a display device (display) for displaying the image, and the like, but a detailed description thereof will be omitted. Software (game program) for executing the game and the replay is stored in the storages of the game terminal device 20E and 201E to 20NE. In addition, replay data is stored in the storages of the game terminal devices 20E and 201E to 20NE.

Figure 18:
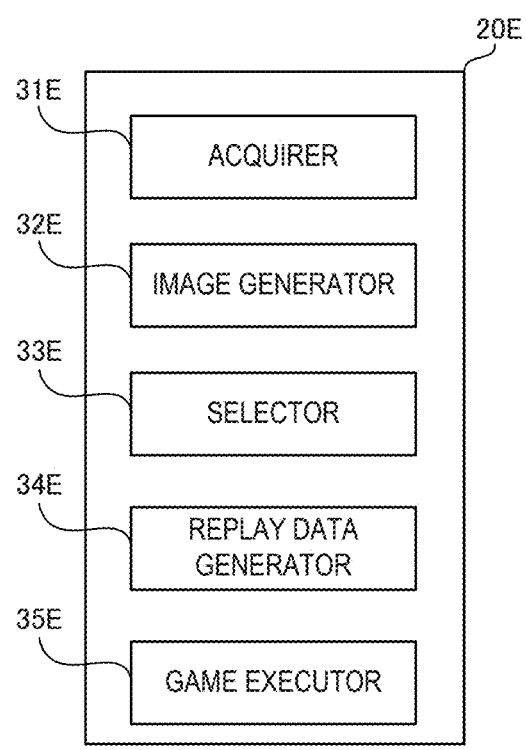
FIG. 18 is another block diagram illustrating the configuration of the game terminal device corresponding to at least one of the embodiments of the invention.

FIG. 18 is a block diagram illustrating the configuration of the game terminal device 20E. The game terminal device 20E includes an acquirer 31E, an image generator 32E, a selector 33E, a replay data generator 34E, and a game executor 35E. Since the other game terminal devices 201E to 20NE have the same configuration, their description will be omitted here.

The acquirer 31E acquires the replay data from the storage based on a designation operation on the operator by the user. The image generator 32E generates a replay image to be displayed on the display of the game terminal device 20E based on the acquired replay data. In a case where the focus character is selected, the image generator 32E generates the replay image in the display format for the focus character as illustrated in FIG. 16. The selector 33E selects one or more characters from the plurality of characters included in the replay data as the focus character based on a selection operation on the operator by the user.

The replay data generator 34E generates the replay data to be stored in the storage of the game terminal device 20E based on a request operation to the operator by the user. Generation of the replay data is performed while the user's game in the game terminal device 20E is playing (while the game is being executed). In the example of this embodiment, the replay data in a period from the start to the end of game execution is generated. The replay data generator 34E acquires necessary information from the game image generation information (packet data) described above received from the server 10E and generates replay data.

The replay data generator 34E generates the replay data in a case where there is a request operation of generating replay data to the operator by the user (host user) of the game terminal device 20E and permission of all other users of the player characters constituting the party other than the user. As described above, the request operation of generating the replay data is performed when the host user creates a bulletin board for recruiting for the party.

Figure 19:
FIG. 19 is a diagram illustrating an example of replay data corresponding to at least one of the embodiments of the invention.

FIG. 19 is a diagram illustrating an example of replay data. The replay data is constituted with of a header code, replay codes, and an end code. FIG. 20A is a diagram illustrating an example of a configuration of the header code. FIG. 20B is a diagram illustrating an example of a configuration of the replay code. FIG. 20C is a diagram illustrating an example of an end code.

Fixed information such as content information is stored in the header code. Specifically, the header code is constituted with fields such as a code ID, a recording date and time, a content ID, and a player character. In the field of the code ID, identification information of the header code is stored. In the field of the recording date and time, recording date and time of the replay data is stored. In the field of the content ID, identification information (content ID) of the content of the game played by the user is stored. For example, identification information is a quest, the content ID of the quest is stored. Based on the content ID, the purpose of the content, the game space, the non-player character appearing, and the like are specified.

In the field of the player character, fixed information on each of the player characters constituting the party is stored. For example, information such as the identification information (user ID), name, sex, occupation, vital power, and the like of the user of the player character are stored.

In the replay code, information on each character for generating the replay image for one frame is stored. In the replay data, the replay codes for the number of frames from the start to the end of replay recording are disposed in chronological order from the header code towards the end code.

The replay code is constituted with fields such as a code ID, a player character, a non-player character, and the like. In the field of the code ID, identification information of the replay code is stored. In the field of the player character, motion information and the like in the corresponding frame are stored for each player character constituting the party. For example, a user ID, movement information, identification information of execution action, target selection information, update information of each parameter, and the like are stored. The movement information is, for example, information on position coordinates in the coordinate system of a game space of the player character.

The identification information of the execution action is identification information of an action such as a jump or walking that the player character is executing. The target selection information is identification information of another character which is the attack targets described above. In the example of this embodiment, the target selection information is described as an attack target, but it is not limited to the target of attack. For example, the target selection information may be another character to be a recovery target for recovering a parameter such as vital power. Otherwise, the target selection information may be another character which is targeted as a target for raising the attack power and defense force parameter by the focus character. The update information of each parameter is information for specifying a value of a parameter such as vital power of the player character in the corresponding frame.

Next, in the field of the non-player character, fixed information on each of the non-player characters appearing in the game space is stored. For example, a character ID, movement information, identification information of execution action, target selection information, update information of each parameter, and the like are stored. The character ID is identification information of the non-player character. The other information has basically the same structure as the field of the player character.

Next, the end code is a code indicating the end of the replay data and is constituted with a field of a code ID and the like. In the field of the code ID, identification information of the end code is stored.

The replay data generator 34E changes information of a name of a player character of at least another user other than the user who performs the request operation of replay data generation, among the player characters included in the replay data, to predetermined information and generates the replay data. That is, information that can specify other users other than the user who requested generation (storage) of replay data is deleted and replay data is generated. In the example of this embodiment, information on the names of the player characters of all guest users is changed to predetermined information.

The replay data generator 34E changes the information of the name of the player character of another user (user ID) in the replay data based on the user ID of the user who performs the request operation. In the example of this embodiment, the information of the name of the player character is changed to a name indicating occupation of the player character.

The user ID of the user may be stored as user information in the storage of the game terminal device 20E used by this user.

Next, when returning to FIG. 18, the game executor 35E executes the game (content) based on information on the game received from the server 10E (progress controller 11). For example, the game executor 35E generates a game image based on game image generation information, and transmits the movement information and the like of the player character to the server 10E.

Next, the operation (replay processing and data generation processing) of the system 100E will be described.

FIG. 21 is a flowchart illustrating an example of replay processing to be executed by the system 100E. In the replay processing in the example of this embodiment, processing of generating a replay image based on the replay data is performed. Hereinafter, the case where the game terminal device 20E of the host user executes the data generation processing will be described as an example. The flowchart illustrating the operation of the server 10 will be omitted from the viewpoint of avoiding redundant description.

The replay processing of the example of this embodiment is executed, for example, in a case where a request operation of replay execution to the operator is performed by the user.

In the replay processing, the game terminal device 20E acquires the replay data (Step S10-E). The game terminal device 20E acquires the replay data designated by the user's operation from the storage.

Next, the game terminal device 20E generates the replay image based on the acquired replay data (Step S11-E). The game terminal device 20E generates the replay image for one frame. The generated replay image is displayed on the display. In a case where the focus character is set in processing of Step S13-E, the replay image is generated in the display format for the focus character as illustrated in FIG. 16.

Next, the game terminal device 20E determines whether or not a selection operation of the focus character is performed by the user (Step S12-E). In a case where it is determined that the selection operation is not performed (NO in Step S12-E), the game terminal device 20E proceeds to processing of Step S14-E. On the other hand, in a case where it is determined that the selection operation is performed (YES in Step S12-E), the game terminal device 20E sets (selects) the focus character based on the selection operation (Step S13-E). Specifically, the game terminal device 20E stores identification information (user ID or character ID) of the focus character in the storage. After the focus character is set, the replay image is generated in the display format for the focus character in image generation processing of Step S11-E.

Thereafter, the game terminal device 20E determines whether or not generation of the replay image is ended (Step S14-E). For example, in a case where generation of a replay image is completed until the end code included in the replay data is reached, the game terminal device 20E determines that the generation of the replay image is ended. In a case where it is determined that the generation of the replay image is not (NO in Step S14-E), the game terminal device 20E returns to processing of Step S11-E. On the other hand, in a case where it is determined that the generation of the replay image is ended (YES in Step S14-E), the game terminal device 20E ends the replay processing.

FIG. 22 is a flowchart illustrating an example of data generation processing of replay executed by the system 100E. In the data generation processing in the example of this embodiment, processing in which replay data of a game being played is generated and stored in the storage is performed. Hereinafter, a case where the game terminal device 20E executes the data generation processing will be described as an example. Description will be made on the assumption that the user of the game terminal device 20E performs a request operation of generating replay data. The flowchart illustrating the operation of the server 10 will be omitted from the viewpoint of avoiding redundant description.

The data generation processing of the example of this embodiment is executed, for example, in a case where a game (contents) for the bulletin board of the party recruitment having setting of the replay data generation is started.

In the data generation processing, the game terminal device 20E determines whether or not permission of another user is acquired (Step S20-E). As described above, it is determined whether or not permission is obtained from all of the guest users (game terminal devices) other than the host user (game terminal device 20E) who performs the request operation among the users (game terminal devices) of the player characters constituting the party. That is, in a case where all the guest users check the checkbox of permission to generate replay data of the bulletin board 60 and participate in the party, generation of the replay data is permitted. The game terminal device 20E makes a determination based on permission information of generation of the replay data received from the server 10E (progress controller 11E).

In a case where it is determined that all permissions are not acquired (NO in Step S20-E), the game terminal device 20E ends the data generation processing. On the other hand, in a case where it is determined that all permissions are acquired (YES in Step S20-E), the game terminal device 20E acquires information necessary for generating the replay data of each character including the player character (Step S21-E). As described above, the game terminal device 20E acquires the information necessary for generating the replay data from the game image generation information received from the server 10E.

Next, the game terminal device 20E generates the replay data as illustrated in FIGS. 19 and 20A to 20C (Step S22-E). After the header code is generated, the game terminal device 20E generates data for one frame constituting the replay data. Further, the generated replay data may be temporarily stored in the RAM or the like until generation of entire replay data is completed.

Thereafter, the game terminal device 20E determines whether or not the game (content) that the user is playing is ended (Step S23-E). In a case where it is determined that the game is not ended (NO in Step S23-E), the game terminal device 20E returns to processing of Step S21-E. On the other hand, in a case where it is determined that the game character is ended (YES in Step S23-E), the game terminal device 20E changes the name of the player character included in the replay data (Step S24-E). As described above, the information on the name of the player character of another user other than the user who performs the request operation (host user) is changed to predetermined information (name of occupation).

Thereafter, the game terminal device 20E causes the storage to store the replay data to which the end code is added (Step S25-E), and ends the data generation processing.

As described above, as one aspect of the fifth embodiment, since the game terminal device 20E is configured to include the acquirer 31E, the image generator 32E, the selector 33E, the replay data generator 34E, and the game executor 35E, the replay image is generated in the display format for the character (focus character) the user wants to watch. Accordingly, in the replay image, the motion and the like of the focus character can be ascertained in more detail. With this configuration, for example, in a case where player characters of a plurality of users constituting one party exist in the game space in the replay image, motion of each player character can be ascertained in detail, and the motion of each player character in a cooperative play by a plurality of users can be used as a reference for future play.

Since information for specifying another character associated with the focus character is displayed as the display format for the focus character, a relationship between the focus character and the other character can be ascertained from the replay image. For example, it is possible to ascertain from the replay image what kind of another character is targeted as an attack target by the focus character at what timing.

Furthermore, information of the name of the player character of at least another user other than the user who performs the request operation, among the player characters included in the replay data, is changed to predetermined information and the replay data is generated. Accordingly, it is difficult for other users included in the replay data to be specified. For that reason, for example, even in a case where the user who requested generation (storage) of replay data posted video generated from the replay data on a public WEB site or the like, there is little adverse effect on the other user.

The replay data is generated when permission of at least users other than the user who performs the request operation is given among the users of the player characters included in the replay data. Accordingly, it is possible to prevent the replay data from being generated in a state where other users do not recognize.

In the example of this embodiment described above, only one character is set as the focus character, but a plurality of characters may be set as the focus character. For example, in the case of the display format in which a marker image is displayed on the attack target of the focus character, marker images of attack targets of a plurality of focus characters are displayed. In this case, shapes and the like of the marker images may be different for each focus character.

In the example of this embodiment described above, a game that forms a party is described, but the invention is not particularly limited thereto.

In the example of the embodiment described above, the server causes the game played by the user to progress, but the game terminal device may cause the game to progress, or the server and the game terminal device may cooperatively cause the game to progress. Further, the server may execute only the data generation processing as described above and the game terminal device may execute the replay processing. In this case, the generated replay data may be transmitted from the server to the game terminal device.

In the example of the embodiment described above, the request operation for generation of the replay data is performed at the time of generating the bulletin board generation request, but the invention is not particularly limited thereto. For example, the request operation of generating the replay data may be received during game execution. In this case, after the request operation is received, the host user (game terminal device) may transmit an inquiry on whether to generate the replay data to the guest user (game terminal device).

Appendix

In the above description, the embodiments have been described such that at least the following inventions can be realized by those skilled in the art.

[1]

A video game program for causing a computer to realize:

an acquisition function of acquiring replay data for reproducing play contents already ended of a user in a game space in which a plurality of characters including a player character of the user appear;

an image generation function of generating a replay image to be displayed on a display based on the acquired replay data; and a selection function of selecting one or more characters from among the plurality of characters as a focus character based on a selection operation on an operator by the user, in which, in the image generation function, a function of generating the replay image in a display format for the focus character is realized.

[2]

The video game program according to [1], in which, in the image generation function, a function of generating a replay image for displaying information for specifying another character associated with the focus character as the display format for the focus character is realized.

[3]

The video game program according to [1] or [2], in which, the computer is one of a game terminal device for executing a game in which the plurality of characters including the player character of the user appears in the game space or a server device connected to the game terminal device via a communication network, in a game system including a plurality of the game terminal devices and the server device, and the video game program causes the computer to further realize a replay data generation function of generating the replay data and storing the replay data in a storage based on a request operation on the operator by the user, and in the replay data generation function, a function of changing information on a name of at least a player character of another user other than the user who performs the request operation among the player characters included in the replay data to predetermined information and generating the replay data, based on identification information of the user who performs the request operation, is realized.

[4]

The video game program according to any one of [1] to [3], in which, the computer is one of a game terminal device for executing a game in which the plurality of characters including the player character of the user appears in the game space or a server device connected to the game terminal device via a communication network, in a game system including plurality of game terminal devices and the server device, the video game program causes the computer to further realize a replay data generation function of generating the replay data and storing the replay data in a storage based on a request operation on the operator by the user, and in the replay data generation function, a function of generating the replay data in a case where permission of another user other than the user who performs the request operation of the player character included in the replay data is acquired is realized.

[5]

The video game program according to [2], in which, the other character associated with the focus character is an attack target of the focus character.

[6]

The video game program according to [2] or [5], in which, in the image generation function, a function of generating a replay image for displaying a marker image around the other character as information for specifying the other character.

[7]

The video game program according to any one of [1] to [6], in which, the game space is a virtual three-dimensional space, and in the image generation function, a function of generating an image photographed by a virtual camera using the focus character as a subject as a replay image is realized.

[8]

A server device having the game program according to any one of [1] to [7] installed thereon.

[9]

A terminal program for causing a game terminal device to realize a function of displaying a game screen on a display screen of a display to execute a video game, the terminal program causes the game terminal device to realize a connection function of connecting with the server device according to [8] via a communication network.

[10]

A game terminal device having the game program according to any one of [1] to [7] installed thereon.

[11]

A video game program for causing a server device connected to a plurality of game terminal devices that execute a game in which a plurality of characters including a player character of a user appear in the game space via a communication network, to realize:

an acquisition function of acquiring replay data for reproducing play contents already ended of the user in the game space in which the plurality of characters appear;

an image generation function of generating a replay image to be displayed on a display of the game terminal device based on the acquired replay data; and a selection function of selecting one or more characters from among the plurality of characters as a focus character based on a selection operation on an operator of the game terminal device by the user, in which, in the image generation function, a function of generating the replay image in a display format for the focus character is realized.

[12]

The video game program according to [11], in which, in the image generation function, a function of generating the replay image for displaying information for specifying another character associated with the focus character by using the display format for the focus character is realized.

[13]

The video game program according to [11] or [12], in which, the video game program causes the server device to further realize a replay data generation function of generating the replay data and storing the replay data in a storage, based on a request operation on an operator by the user of the game terminal device, and in the replay data generation function, a function of changing information on a name of a player character of at least another user other than the user who performs the request operation among the player characters included in replay data to predetermined information and generating the replay data, based on identification information of the user who performs the request operation, is realized.

[14]

The video game program according to any one of [11] to [13], in which, the video game program causes the server device to further realize a replay data generation function of generating the replay data and storing the replay data in the storage, based on a request operation on the operator by the user of the game terminal device, and in the replay data generation function, a function of generating the replay data in a case where permission of another user other than the user who performs the request operation of the player character included in the replay data is acquired is realized.

[15]

The video game program according to [12], in which, another character associated with the focus character is an attack target of the focus character.

[16]

The video game program according to [12] or [15], in which, in the image generation function, a function of generating a replay image for displaying a marker image around the other character as information for specifying the other character.

[17]

The video game program according to any one of [11] to [16]

in which, the game space is a virtual three-dimensional space, and in the image generation function, a function of generating an image photographed by a virtual camera having the focus character as a subject as a replay image is realized.

[18]

A game system, including:

a plurality of game terminal devices that execute a game in which a plurality of characters including a player character of a user appears in a game space; a server device connected to a plurality of game terminal devices via a communication network;

an acquirer that acquires replay data for reproducing play contents already ended of the user in a game space in which a plurality of characters appear;

an image generator that generates a replay image to be displayed on a display of the game terminal device based on the acquired replay data; and a selector that selects one or more characters from among the plurality of characters as a focus character based on a selection operation on an operator of the game terminal device by the user, wherein the image generator generates the replay image in a display format for the focus character.

[19]

A game terminal device including:

an acquirer that acquires replay data for reproducing play contents already ended of a user in a game space in which a plurality of characters including a player character of the user appear;

an image generator that generates a replay image to be displayed on a display based on the acquired replay data; and a selector that selects one or more characters from among the plurality of characters as a focus character based on a selection operation on an operator by the user, in which the image generator generates the replay image in a display format for the focus character.

[20]

A video game reproduction method for reproducing play contents already ended of a user in a game space in which a plurality of characters including a player character of the user appear, the video game reproduction method comprising:

acquisition processing of acquiring replay data for reproducing play contents already ended of a user in the game space in which the plurality of characters including the player character of the user appear;

image generation processing of generating a replay image to be displayed on a display based on the acquired replay data; and selection processing of selecting one or more characters from among the plurality of characters as a focus character based on a selection operation on an operator by the user, in which, in the image generation processing, the replay image is generated in a display format for the focus character.

According to one of the embodiments of the invention, it is useful for providing a replay image that makes it easier to ascertain more detailed information on other characters existing in the game space together with the player character of the user.

What is claimed is:

1. A non-transitory computer-readable medium including a video game program that, when executed by a computer, causes the computer to realize operations, the computer being one of a game terminal device for executing a game in which a plurality of characters including a first player character of a first user appear in a game space or a server device connected to the game terminal device via a communication network, in a game system including a plurality of the game terminal device and the server device, the operations comprising:

generating replay data for reproducing play contents already ended of the first user in the game space in which the plurality of characters including the first player character of the first user appear;

generating a replay image to be displayed on a display based on the replay data; and storing the replay data in a storage, wherein, in the generating of the replay data, information on a name of a second player character of at least a second user other than the first user among the plurality of characters included in the replay data is changed to predetermined information, the replay data is not image data and is data for reproducing the play contents of the first user, and the replay data includes position information of each of the plurality of characters appearing in the game space in units of one frame.

2. The non-transitory computer-readable medium according to claim 1, wherein, in the generating of the replay data, the information on the name of the second player character of at least the second user other than the first user among the plurality of characters included in the replay data is deleted.

3. The non-transitory computer-readable medium according to claim 1, wherein, in the generating of the replay image, the replay image displays the predetermined information for specifying the second player character.

4. The non-transitory computer-readable medium according to claim 1,
wherein, in the generating of the replay data, the predetermined information which specifies the second player character is generated from identification information of the first user.

5. The non-transitory computer-readable medium according to claim 1,
wherein, in the generating of the replay data, the information on the name of the second player character of at least the second user other than the first user among the plurality of characters included in the replay data is changed to the predetermined information in response to a permission of the second user not being acquired.

6. The non-transitory computer-readable medium according to claim 1,
wherein, in the generating of the replay data, information on names of all player characters of all users other than the first user among the plurality of characters included in the replay data is changed to the predetermined information.

7. The non-transitory computer-readable medium according to claim 6,
wherein, in the generating of the replay data, the information on the names of all of the player characters of all of the users other than the first user among the plurality of characters included in the replay data is changed to the predetermined information in response to permissions not being acquired from all of the users other than the first user.

8. The non-transitory computer-readable medium according to claim 1,
wherein, in the generating of the replay data, the information on the name of the second player character of at least the second user other than the first user among the plurality of characters included in the replay data is changed to a tribe of the second player character as the predetermined information.

9. The non-transitory computer-readable medium according to claim 1,
wherein, in the generating of the replay data, the information on the name of the second player character of at least the second user other than the first user among the plurality of characters included in the replay data is changed to an occupation of the second player character as the predetermined information.

10. The non-transitory computer-readable medium according to claim 1,
wherein, in the generating of the replay data, information on a third player character whose name is not included in the replay data is not changed.

11. The non-transitory computer-readable medium according to claim 1, the operations further comprising:
selecting one or more characters from among the plurality of characters as a focus character of the replay image based on a selection operation from one of the plurality of the game terminal device.

12. The non-transitory computer-readable medium according to claim 11,
wherein, in the generating of the replay data, the replay image is generated in a display format for the focus character.

13. A game system, comprising:
a plurality of game terminal devices that execute a game in which a plurality of characters, including a first player character of a first user and a second player character of a second user, appears in a game space; and
a server device connected to the plurality of game terminal devices via a communication network;
wherein at least one of a first game terminal of the plurality of game terminal devices or the server device is configured to execute operations when executing a video game program, the operations including:
generating replay data for reproducing play contents already ended of the first user in the game space;
generating a replay image to be displayed on a display based on the replay data; and
storing the replay data in a storage,
wherein, in the generating of the replay data, at least information on a name of the second player character of the second user other than the first user among the plurality of characters included in the replay data is changed to predetermined information,
the replay data is not image data and is data for reproducing the play contents of the first user, and
the replay data includes position information of each of the plurality of characters appearing in the game space in units of one frame.

* * * * *